United States Patent
Uytingco et al.

(10) Patent No.: US 12,553,898 B1
(45) Date of Patent: Feb. 17, 2026

(54) FLUORESCENT HYBRIDIZATION OF ANTIBODY-OLIGONUCLEOTIDE FOR MULTIPLEXING AND SIGNAL AMPLIFICATION

(71) Applicant: 10x Genomics, Inc., Pleasanton, CA (US)

(72) Inventors: Cedric Uytingco, Pleasanton, CA (US); Zachary Bent, Pleasanton, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 1143 days.

(21) Appl. No.: 17/398,510

(22) Filed: Aug. 10, 2021

Related U.S. Application Data

(60) Provisional application No. 63/063,597, filed on Aug. 10, 2020.

(51) Int. Cl.
*G01N 33/58* (2006.01)
*C12Q 1/6804* (2018.01)
*G01N 1/30* (2006.01)

(52) U.S. Cl.
CPC ......... *G01N 33/582* (2013.01); *C12Q 1/6804* (2013.01); *G01N 1/30* (2013.01); *G01N 2001/305* (2013.01)

(58) Field of Classification Search
None
See application file for complete search history.

(56) References Cited

U.S. PATENT DOCUMENTS

| | | | |
|---|---|---|---|
| 4,683,195 A | 7/1987 | Mullis | |
| 4,683,202 A | 7/1987 | Mullis | |
| 4,800,159 A | 1/1989 | Mullis | |
| 4,883,867 A | 11/1989 | Lee | |
| 4,965,188 A | 10/1990 | Mullis | |
| 5,002,882 A | 3/1991 | Lunnen | |
| 5,130,238 A | 7/1992 | Malek | |
| 5,308,751 A | 5/1994 | Ohkawa | |
| 5,321,130 A | 6/1994 | Yue | |
| 5,410,030 A | 4/1995 | Yue | |
| 5,436,134 A | 7/1995 | Haugland | |
| 5,455,166 A | 10/1995 | Walker | |
| 5,494,810 A | 2/1996 | Barany et al. | |
| 5,503,980 A | 4/1996 | Cantor | |
| 5,512,439 A | 4/1996 | Hornes | |
| 5,512,462 A | 4/1996 | Cheng | |
| 5,582,977 A | 12/1996 | Yue | |

(Continued)

FOREIGN PATENT DOCUMENTS

| | | |
|---|---|---|
| CN | 1680604 | 10/2005 |
| EP | 1712623 | 10/2006 |

(Continued)

OTHER PUBLICATIONS

Simon et al. Immunohistochemical analysis of tissue microarrays. Methods Mol Biol. 2010;664:113-26. (Year: 2010).*

(Continued)

*Primary Examiner* — Rebecca M Giere
*Assistant Examiner* — Alexander Alexandrovic Volkov
(74) *Attorney, Agent, or Firm* — Fish & Richardson P.C.

(57) ABSTRACT

Provided herein are methods of determining a location or presence of a target analyte in a biological sample by detecting oligonucleotide-conjugated binding agents.

19 Claims, 4 Drawing Sheets

(56) References Cited

U.S. PATENT DOCUMENTS

| | | |
|---|---|---|
| 5,599,675 A | 2/1997 | Brenner |
| 5,641,658 A | 6/1997 | Adams |
| 5,648,245 A | 7/1997 | Fire et al. |
| 5,658,751 A | 8/1997 | Yue |
| 5,750,341 A | 5/1998 | Macevicz |
| 5,763,175 A | 6/1998 | Brenner |
| 5,830,711 A | 11/1998 | Barany et al. |
| 5,837,832 A | 11/1998 | Chee et al. |
| 5,854,033 A | 12/1998 | Lizardi |
| 5,863,753 A | 1/1999 | Haugland |
| 5,871,921 A | 2/1999 | Landegren et al. |
| 5,912,148 A | 6/1999 | Eggerding |
| 6,013,440 A | 1/2000 | Lipshutz |
| 6,027,889 A | 2/2000 | Barany et al. |
| 6,060,240 A | 5/2000 | Kamb et al. |
| 6,130,073 A | 10/2000 | Eggerding |
| 6,143,496 A | 11/2000 | Brown |
| 6,153,389 A | 11/2000 | Haarer |
| 6,165,714 A | 12/2000 | Lane et al. |
| 6,210,891 B1 | 4/2001 | Nyren |
| 6,210,894 B1 | 4/2001 | Brennan |
| 6,214,587 B1 | 4/2001 | Dattagupta |
| 6,258,568 B1 | 7/2001 | Nyren |
| 6,266,459 B1 | 7/2001 | Walt |
| 6,274,320 B1 | 8/2001 | Rothberg |
| 6,300,063 B1 | 10/2001 | Lipshutz et al. |
| 6,309,824 B1 | 10/2001 | Drmanac |
| 6,344,316 B1 | 2/2002 | Lockhart |
| 6,355,431 B1 | 3/2002 | Chee |
| 6,368,801 B1 | 4/2002 | Faruqi |
| 6,401,267 B1 | 6/2002 | Drmanac |
| 6,404,907 B1 | 6/2002 | Gilchrist |
| 6,432,360 B1 | 8/2002 | Church et al. |
| 6,503,713 B1 | 1/2003 | Rana |
| 6,506,561 B1 | 1/2003 | Cheval et al. |
| 6,534,266 B1 | 3/2003 | Singer |
| 6,544,732 B1 | 4/2003 | Chee |
| 6,579,695 B1 | 6/2003 | Lambalot |
| 6,620,584 B1 | 9/2003 | Chee |
| 6,632,641 B1 | 10/2003 | Brennan |
| 6,699,710 B1 | 3/2004 | Kononen |
| 6,737,236 B1 | 5/2004 | Pieken et al. |
| 6,770,441 B2 | 8/2004 | Dickinson |
| 6,773,886 B2 | 8/2004 | Kaufman |
| 6,787,308 B2 | 9/2004 | Balasubramanian |
| 6,800,453 B2 | 10/2004 | Labaer |
| 6,812,005 B2 | 11/2004 | Fan et al. |
| 6,828,100 B1 | 12/2004 | Ronaghi |
| 6,833,246 B2 | 12/2004 | Balasubramanian |
| 6,859,570 B2 | 2/2005 | Walt |
| 6,864,052 B1 | 3/2005 | Drmanac |
| 6,897,023 B2 | 5/2005 | Fu |
| 6,942,968 B1 | 9/2005 | Dickinson et al. |
| 7,057,026 B2 | 6/2006 | Barnes |
| 7,115,400 B1 | 10/2006 | Adessi |
| 7,118,883 B2 | 10/2006 | Inoue |
| 7,166,431 B2 | 1/2007 | Chee et al. |
| 7,192,735 B2 | 3/2007 | Lambalot |
| 7,211,414 B2 | 5/2007 | Hardin |
| 7,255,994 B2 | 8/2007 | Lao |
| 7,258,976 B2 | 8/2007 | Mitsuhashi |
| 7,297,518 B2 | 11/2007 | Quake |
| 7,329,492 B2 | 2/2008 | Hardin |
| 7,361,488 B2 | 4/2008 | Fan et al. |
| 7,378,242 B2 | 5/2008 | Hurt |
| 7,393,665 B2 | 7/2008 | Brenner |
| 7,405,281 B2 | 7/2008 | Xu |
| 7,407,757 B2 | 8/2008 | Brenner |
| 7,537,897 B2 | 5/2009 | Brenner |
| 7,563,576 B2 | 7/2009 | Chee |
| 7,582,420 B2 | 9/2009 | Oliphant et al. |
| 7,601,498 B2 | 10/2009 | Mao |
| 7,635,566 B2 | 12/2009 | Brenner |
| 7,674,752 B2 | 3/2010 | He |
| 7,700,286 B2 | 4/2010 | Stroun et al. |
| 7,709,198 B2 | 5/2010 | Luo et al. |
| 7,776,567 B2 | 8/2010 | Mao |
| 7,803,943 B2 | 9/2010 | Mao |
| 7,910,304 B2 | 3/2011 | Drmanac |
| 7,955,794 B2 | 6/2011 | Shen et al. |
| 7,960,119 B2 | 6/2011 | Chee |
| 8,003,354 B2 | 8/2011 | Shen et al. |
| 8,148,068 B2 | 4/2012 | Brenner |
| 8,206,917 B2 | 6/2012 | Chee |
| 8,207,093 B2 | 6/2012 | Szostak |
| 8,288,103 B2 | 10/2012 | Oliphant |
| 8,460,865 B2 | 6/2013 | Chee |
| 8,481,257 B2 | 7/2013 | Van Eijk |
| 8,603,743 B2 | 12/2013 | Liu et al. |
| 8,604,182 B2 | 12/2013 | Luo et al. |
| 8,815,512 B2 | 8/2014 | Van Eijk |
| 8,835,358 B2 | 9/2014 | Fodor |
| 8,911,945 B2 | 12/2014 | Van Eijk |
| 8,951,726 B2 | 2/2015 | Luo et al. |
| 9,062,348 B1 | 6/2015 | Van Eijk |
| 9,194,001 B2 | 11/2015 | Brenner |
| 9,201,063 B2 | 12/2015 | Sood et al. |
| 9,290,808 B2 | 3/2016 | Fodor |
| 9,290,809 B2 | 3/2016 | Fodor |
| 9,328,383 B2 | 5/2016 | Van Eijk |
| 9,330,295 B2 | 5/2016 | Dunn |
| 9,334,536 B2 | 5/2016 | Van Eijk |
| 9,371,598 B2 | 6/2016 | Chee |
| 9,376,717 B2 | 6/2016 | Gao et al. |
| 9,506,061 B2 | 11/2016 | Brown et al. |
| 9,593,365 B2 | 3/2017 | Frisen et al. |
| 9,644,204 B2 | 5/2017 | Hindson et al. |
| 9,694,361 B2 | 7/2017 | Bharadwaj |
| 9,702,004 B2 | 7/2017 | Van Eijk |
| 9,714,446 B2 | 7/2017 | Webster et al. |
| 9,727,810 B2 | 8/2017 | Fodor et al. |
| 9,777,324 B2 | 10/2017 | Van Eijk |
| 9,783,841 B2 | 10/2017 | Nolan et al. |
| 9,834,814 B2 | 12/2017 | Peter et al. |
| 9,850,536 B2 | 12/2017 | Oliphant et al. |
| 9,868,979 B2 | 1/2018 | Chee et al. |
| 9,879,313 B2 | 1/2018 | Chee et al. |
| 10,002,316 B2 | 6/2018 | Fodor et al. |
| 10,023,907 B2 | 7/2018 | Van Eijk |
| 10,030,261 B2 | 7/2018 | Frisen et al. |
| 10,041,949 B2 | 8/2018 | Bendall et al. |
| 10,059,990 B2 | 8/2018 | Boyden et al. |
| 10,208,982 B2 | 2/2019 | Bannish et al. |
| 10,266,876 B2 | 4/2019 | Cai et al. |
| 10,273,541 B2 | 4/2019 | Hindson et al. |
| 10,308,982 B2 | 6/2019 | Chee |
| 10,357,771 B2 | 7/2019 | Bharadwaj |
| 10,472,669 B2 | 11/2019 | Chee |
| 10,480,022 B2 | 11/2019 | Chee |
| 10,480,029 B2 | 11/2019 | Bent et al. |
| 10,494,667 B2 | 12/2019 | Chee |
| 10,510,435 B2 | 12/2019 | Cai et al. |
| 10,550,429 B2 | 2/2020 | Harada et al. |
| 10,590,244 B2 | 3/2020 | Delaney et al. |
| 10,662,468 B2 | 5/2020 | Chee |
| 10,724,078 B2 | 7/2020 | Van Driel et al. |
| 10,725,027 B2 | 7/2020 | Bell |
| 10,774,372 B2 | 9/2020 | Chee et al. |
| 10,774,374 B2 | 9/2020 | Frisen et al. |
| 10,787,701 B2 | 9/2020 | Chee |
| 10,858,702 B2 | 12/2020 | Lucero et al. |
| 10,913,975 B2 | 2/2021 | So et al. |
| 10,914,730 B2 | 2/2021 | Chee et al. |
| 10,927,403 B2 | 2/2021 | Chee et al. |
| 10,961,566 B2 | 3/2021 | Chee |
| 11,001,879 B1 | 5/2021 | Chee |
| 11,008,607 B2 | 5/2021 | Chee |
| 11,046,996 B1 | 6/2021 | Chee et al. |
| 11,067,567 B2 | 7/2021 | Chee |
| 11,156,603 B2 | 10/2021 | Chee |
| 11,162,132 B2 | 11/2021 | Frisen et al. |
| 11,208,684 B2 | 12/2021 | Chee |
| 11,214,796 B2 | 1/2022 | Shirai et al. |
| 11,286,515 B2 | 3/2022 | Chee et al. |

(56) References Cited

U.S. PATENT DOCUMENTS

| | | |
|---|---|---|
| 11,293,917 B2 | 4/2022 | Chee |
| 11,299,774 B2 | 4/2022 | Frisen et al. |
| 11,313,856 B2 | 4/2022 | Chee |
| 11,332,790 B2 | 5/2022 | Chell et al. |
| 11,352,659 B2 | 6/2022 | Frisen et al. |
| 11,352,667 B2 | 6/2022 | Hauling et al. |
| 11,359,228 B2 | 6/2022 | Chee et al. |
| 11,365,442 B2 | 6/2022 | Chee |
| 11,371,086 B2 | 6/2022 | Chee |
| 11,384,386 B2 | 7/2022 | Chee |
| 11,390,912 B2 | 7/2022 | Frisen et al. |
| 11,401,545 B2 | 8/2022 | Chee |
| 11,407,992 B2 | 8/2022 | Dadhwal |
| 11,408,029 B2 | 8/2022 | Katiraee et al. |
| 11,434,524 B2 | 9/2022 | Ramachandran Iyer et al. |
| 11,459,607 B1 | 10/2022 | Terry et al. |
| 11,479,809 B2 | 10/2022 | Frisen et al. |
| 11,479,810 B1 | 10/2022 | Chee |
| 11,492,612 B1 | 11/2022 | Dadhwal |
| 11,501,440 B2 | 11/2022 | Weisenfeld et al. |
| 11,505,828 B2 | 11/2022 | Chell et al. |
| 11,512,308 B2 | 11/2022 | Gallant et al. |
| 11,519,022 B2 | 12/2022 | Chee |
| 11,519,033 B2 | 12/2022 | Schnall-Levin et al. |
| 11,519,138 B2 | 12/2022 | Meier |
| 11,530,438 B2 | 12/2022 | Persson et al. |
| 11,535,887 B2 | 12/2022 | Gallant et al. |
| 11,542,543 B2 | 1/2023 | Chee |
| 11,549,138 B2 | 1/2023 | Chee |
| 11,560,587 B2 | 1/2023 | Chee |
| 11,560,592 B2 | 1/2023 | Chew et al. |
| 11,560,593 B2 | 1/2023 | Chell et al. |
| 11,592,447 B2 | 2/2023 | Uytingco et al. |
| 11,608,498 B2 | 3/2023 | Gallant et al. |
| 11,608,520 B2 | 3/2023 | Galonska et al. |
| 11,613,773 B2 | 3/2023 | Frisen et al. |
| 11,618,897 B2 | 4/2023 | Kim et al. |
| 11,618,918 B2 | 4/2023 | Chee et al. |
| 11,624,063 B2 | 4/2023 | Dadhwal |
| 11,624,086 B2 | 4/2023 | Uytingco et al. |
| 11,634,756 B2 | 4/2023 | Chee |
| 11,649,485 B2 | 5/2023 | Yin et al. |
| 11,661,626 B2 | 5/2023 | Katiraee et al. |
| 11,680,260 B2 | 6/2023 | Kim et al. |
| 11,692,218 B2 | 7/2023 | Engblom et al. |
| 11,702,693 B2 | 7/2023 | Bharadwaj |
| 11,702,698 B2 | 7/2023 | Stoeckius |
| 11,713,480 B2 | 8/2023 | Lee |
| 11,732,292 B2 | 8/2023 | Chee |
| 11,732,299 B2 | 8/2023 | Ramachandran Iyer |
| 11,732,300 B2 | 8/2023 | Bava |
| 11,733,238 B2 | 8/2023 | Chee |
| 11,739,372 B2 | 8/2023 | Frisen et al. |
| 11,739,381 B2 | 8/2023 | Chew et al. |
| 11,753,673 B2 | 9/2023 | Chew et al. |
| 11,753,674 B2 | 9/2023 | Chee et al. |
| 11,753,675 B2 | 9/2023 | Ramachandran Iyer |
| 11,761,030 B2 | 9/2023 | Chee |
| 11,761,038 B1 | 9/2023 | Stoeckius |
| 11,767,550 B2 | 9/2023 | Chee |
| 11,768,175 B1 | 9/2023 | Kim et al. |
| 11,773,433 B2 | 10/2023 | Gallant et al. |
| 11,781,130 B2 | 10/2023 | Dadhwal |
| 11,788,122 B2 | 10/2023 | Frisen et al. |
| 11,795,498 B2 | 10/2023 | Frisen et al. |
| 11,795,507 B2 | 10/2023 | Chell et al. |
| 11,808,769 B2 | 11/2023 | Uytingco et al. |
| 11,821,024 B2 | 11/2023 | Chee et al. |
| 11,821,035 B1 | 11/2023 | Bent et al. |
| 11,827,935 B1 | 11/2023 | Ramachandran Iyer et al. |
| 11,835,462 B2 | 12/2023 | Bava |
| 11,840,687 B2 | 12/2023 | Gallant et al. |
| 11,840,724 B2 | 12/2023 | Chew et al. |
| 11,845,979 B2 | 12/2023 | Engblom et al. |
| 11,859,178 B2 | 1/2024 | Gallant et al. |
| 11,866,767 B2 | 1/2024 | Uytingco et al. |
| 11,866,770 B2 | 1/2024 | Chee |
| 11,873,482 B2 | 1/2024 | Kim et al. |
| 11,891,654 B2 | 2/2024 | Alvarado Martinez et al. |
| 11,898,205 B2 | 2/2024 | Bava |
| 11,926,822 B1 | 3/2024 | Gohil et al. |
| 11,926,863 B1 | 3/2024 | Boutet |
| 11,926,867 B2 | 3/2024 | Yin et al. |
| 11,933,957 B1 | 3/2024 | Tentori et al. |
| 11,952,627 B2 | 4/2024 | Stoeckius |
| 11,959,076 B2 | 4/2024 | Kim et al. |
| 11,959,130 B2 | 4/2024 | Galonska et al. |
| 11,965,213 B2 | 4/2024 | Williams |
| 11,970,739 B2 | 4/2024 | Chew et al. |
| 11,981,958 B1 | 5/2024 | Galonska |
| 11,981,960 B1 | 5/2024 | Lin et al. |
| 11,981,965 B2 | 5/2024 | Chell et al. |
| RE50,065 E | 7/2024 | Frisen et al. |
| 12,024,741 B2 | 7/2024 | Tentori et al. |
| 12,031,177 B1 | 7/2024 | Tentori et al. |
| 12,060,604 B2 | 8/2024 | Katiraee et al. |
| 12,071,655 B2 | 8/2024 | Sukovich et al. |
| 12,076,701 B2 | 9/2024 | Bava |
| 12,098,417 B2 | 9/2024 | Engblom et al. |
| 12,098,985 B2 | 9/2024 | Cox et al. |
| 12,110,541 B2 | 10/2024 | Bava |
| 12,117,439 B2 | 10/2024 | Delaney et al. |
| 12,128,403 B2 | 10/2024 | Kim et al. |
| 12,129,516 B2 | 10/2024 | Tentori et al. |
| 12,157,124 B2 | 12/2024 | Cox et al. |
| 12,180,543 B2 | 12/2024 | Uytingco et al. |
| 12,195,790 B2 | 1/2025 | Sukovich et al. |
| 12,203,134 B2 | 1/2025 | Nagendran et al. |
| 12,209,280 B1 | 1/2025 | Mignardi et al. |
| 12,223,751 B2 | 2/2025 | Li et al. |
| 12,228,544 B2 | 2/2025 | Kim et al. |
| 12,234,505 B2 | 2/2025 | Chee |
| 12,241,060 B2 | 3/2025 | Kim et al. |
| 12,241,890 B2 | 3/2025 | Delaney et al. |
| 12,249,085 B2 | 3/2025 | Tentori et al. |
| 12,265,079 B1 | 4/2025 | Bent |
| 12,270,077 B2 | 4/2025 | Schnall-Levin et al. |
| 12,275,988 B2 | 4/2025 | Galonska et al. |
| 12,281,357 B1 | 4/2025 | Tentori et al. |
| 12,286,673 B2 | 4/2025 | Bava |
| 12,287,264 B2 | 4/2025 | Cox et al. |
| 12,297,486 B2 | 5/2025 | Patterson et al. |
| 12,297,487 B2 | 5/2025 | Chee |
| 12,297,488 B2 | 5/2025 | Chee |
| 12,344,892 B2 | 7/2025 | Schnall-Levin et al. |
| 12,365,935 B2 | 7/2025 | Chew et al. |
| 12,365,942 B2 | 7/2025 | Stoeckius |
| 12,371,688 B2 | 7/2025 | Kim et al. |
| 12,378,607 B2 | 8/2025 | Schnall-Levin et al. |
| 12,385,083 B2 | 8/2025 | Shah |
| 12,391,979 B2 | 8/2025 | Chee |
| 12,391,980 B2 | 8/2025 | Chee |
| 12,399,123 B1 | 8/2025 | Shah et al. |
| 12,404,544 B2 | 9/2025 | Tentori et al. |
| 12,405,264 B2 | 9/2025 | Stoeckius |
| 12,416,603 B2 | 9/2025 | Tentori et al. |
| 12,435,363 B1 | 10/2025 | Gallant et al. |
| 12,442,045 B2 | 10/2025 | Williams |
| 2002/0040275 A1 | 4/2002 | Cravatt |
| 2002/0146745 A1 | 10/2002 | Natan et al. |
| 2002/0164611 A1 | 11/2002 | Bamdad |
| 2003/0017451 A1 | 1/2003 | Wang et al. |
| 2003/0022207 A1 | 1/2003 | Balasubramanian |
| 2003/0040035 A1 | 2/2003 | Slamon |
| 2003/0148335 A1 | 8/2003 | Shen et al. |
| 2003/0162216 A1 | 8/2003 | Gold |
| 2003/0211489 A1 | 11/2003 | Shen et al. |
| 2003/0224419 A1 | 12/2003 | Corcoran |
| 2003/0232348 A1 | 12/2003 | Jones et al. |
| 2003/0232382 A1 | 12/2003 | Brennan |
| 2004/0033499 A1 | 2/2004 | Ilsley et al. |
| 2004/0067492 A1 | 4/2004 | Peng et al. |
| 2004/0096853 A1 | 5/2004 | Mayer |
| 2004/0106110 A1 | 6/2004 | Balasubramanian |

(56) References Cited

U.S. PATENT DOCUMENTS

| | | |
|---|---|---|
| 2005/0037393 A1 | 2/2005 | Gunderson et al. |
| 2005/0048580 A1 | 3/2005 | Labaer |
| 2005/0100900 A1 | 5/2005 | Kawashima et al. |
| 2005/0130173 A1 | 6/2005 | Leamon et al. |
| 2005/0136414 A1 | 6/2005 | Gunderson et al. |
| 2005/0170373 A1 | 8/2005 | Monforte |
| 2005/0191656 A1 | 9/2005 | Drmanac et al. |
| 2005/0191698 A1 | 9/2005 | Chee et al. |
| 2005/0202433 A1 | 9/2005 | Van Beuningen |
| 2005/0227271 A1 | 10/2005 | Kwon |
| 2005/0260653 A1 | 11/2005 | LaBaer |
| 2006/0041385 A1 | 2/2006 | Bauer et al. |
| 2006/0211001 A1 | 9/2006 | Yu et al. |
| 2006/0216775 A1 | 9/2006 | Burkart et al. |
| 2006/0263789 A1 | 11/2006 | Kincaid |
| 2007/0020640 A1 | 1/2007 | McCloskey et al. |
| 2007/0054288 A1 | 3/2007 | Su et al. |
| 2007/0099208 A1 | 5/2007 | Drmanac et al. |
| 2007/0128624 A1 | 6/2007 | Gormley et al. |
| 2007/0128656 A1 | 6/2007 | Agrawal |
| 2007/0172873 A1 | 7/2007 | Brenner et al. |
| 2007/0207482 A1 | 9/2007 | Church et al. |
| 2007/0254305 A1 | 11/2007 | Paik et al. |
| 2007/0269805 A1 | 11/2007 | Hogers |
| 2008/0009420 A1 | 1/2008 | Schroth et al. |
| 2008/0108804 A1 | 5/2008 | Hayashizaki et al. |
| 2008/0160580 A1 | 7/2008 | Adessi et al. |
| 2008/0220434 A1 | 9/2008 | Thomas |
| 2008/0261204 A1 | 10/2008 | Lexow |
| 2008/0286795 A1 | 11/2008 | Kawashima et al. |
| 2009/0005252 A1 | 1/2009 | Drmanac et al. |
| 2009/0006002 A1 | 1/2009 | Honisch et al. |
| 2009/0018024 A1 | 1/2009 | Church et al. |
| 2009/0026082 A1 | 1/2009 | Rothberg et al. |
| 2009/0082212 A1 | 3/2009 | Williams |
| 2009/0099041 A1 | 4/2009 | Church et al. |
| 2009/0105959 A1 | 4/2009 | Braverman et al. |
| 2009/0117573 A1 | 5/2009 | Fu et al. |
| 2009/0127589 A1 | 5/2009 | Rothberg et al. |
| 2009/0155781 A1 | 6/2009 | Drmanac et al. |
| 2009/0233802 A1 | 9/2009 | Bignell et al. |
| 2009/0253581 A1 | 10/2009 | van Eijk et al. |
| 2009/0270273 A1 | 10/2009 | Burns et al. |
| 2009/0291854 A1 | 11/2009 | Weisinger-Mayr et al. |
| 2009/0312193 A1 | 12/2009 | Kim et al. |
| 2010/0035249 A1 | 2/2010 | Hayashizaki et al. |
| 2010/0047790 A1 | 2/2010 | Southern et al. |
| 2010/0120043 A1 | 5/2010 | Sood et al. |
| 2010/0120097 A1 | 5/2010 | Matz et al. |
| 2010/0120098 A1 | 5/2010 | Grunenwald et al. |
| 2010/0145037 A1 | 6/2010 | Brive et al. |
| 2011/0028685 A1 | 2/2011 | Purkayastha et al. |
| 2011/0059436 A1 | 3/2011 | Hardin et al. |
| 2011/0237449 A1 | 9/2011 | McMaster et al. |
| 2011/0245111 A1 | 10/2011 | Chee |
| 2012/0135871 A1 | 5/2012 | van Eijk et al. |
| 2012/0202698 A1 | 8/2012 | van Eijk et al. |
| 2013/0171621 A1 | 7/2013 | Luo et al. |
| 2014/0066318 A1 | 3/2014 | Frisen et al. |
| 2014/0270435 A1 | 9/2014 | Dunn |
| 2014/0274731 A1 | 9/2014 | Raymond et al. |
| 2014/0323330 A1 | 10/2014 | Glezer et al. |
| 2014/0378350 A1 | 12/2014 | Hindson et al. |
| 2015/0000854 A1 | 1/2015 | Gann-Fetter et al. |
| 2015/0292988 A1 | 10/2015 | Bharadwaj et al. |
| 2015/0344942 A1 | 12/2015 | Frisen et al. |
| 2016/0108458 A1 | 4/2016 | Frei et al. |
| 2016/0138091 A1 | 5/2016 | Chee et al. |
| 2016/0145677 A1 | 5/2016 | Chee et al. |
| 2016/0253584 A1 | 9/2016 | Fodor et al. |
| 2016/0289740 A1 | 10/2016 | Fu et al. |
| 2016/0298180 A1 | 10/2016 | Chee |
| 2016/0305856 A1 | 10/2016 | Boyden et al. |
| 2017/0016053 A1 | 1/2017 | Beechem et al. |
| 2017/0029875 A1 | 2/2017 | Zhang et al. |
| 2017/0067096 A1 | 3/2017 | Wassie et al. |
| 2017/0089811 A1 | 3/2017 | Tillberg et al. |
| 2017/0159109 A1 | 6/2017 | Zheng et al. |
| 2017/0220733 A1 | 8/2017 | Zhuang et al. |
| 2017/0241911 A1 | 8/2017 | Rockel et al. |
| 2017/0275669 A1 | 9/2017 | Weissleder et al. |
| 2017/0342405 A1 | 11/2017 | Fu et al. |
| 2018/0051322 A1 | 2/2018 | Church et al. |
| 2018/0057873 A1 | 3/2018 | Zhou et al. |
| 2018/0088112 A1 | 3/2018 | Fan et al. |
| 2018/0112261 A1 | 4/2018 | Van Driel et al. |
| 2018/0201980 A1 | 7/2018 | Chee et al. |
| 2018/0216161 A1 | 8/2018 | Chen et al. |
| 2018/0216162 A1 | 8/2018 | Belhocine et al. |
| 2018/0245142 A1 | 8/2018 | So et al. |
| 2018/0291439 A1 | 10/2018 | van Eijk et al. |
| 2018/0305681 A1 | 10/2018 | Jovanovich et al. |
| 2018/0334670 A1 | 11/2018 | Bharadwaj et al. |
| 2018/0346969 A1* | 12/2018 | Chang ............ C12Q 1/6876 |
| 2019/0032128 A1 | 1/2019 | Chen et al. |
| 2019/0055594 A1 | 2/2019 | Samusik et al. |
| 2019/0064173 A1 | 2/2019 | Bharadwaj et al. |
| 2019/0085383 A1 | 3/2019 | Church et al. |
| 2019/0161796 A1 | 5/2019 | Hauling et al. |
| 2019/0177777 A1 | 6/2019 | Chee |
| 2019/0177778 A1 | 6/2019 | Chee |
| 2019/0177789 A1 | 6/2019 | Hindson et al. |
| 2019/0177800 A1 | 6/2019 | Boutet et al. |
| 2019/0194709 A1 | 6/2019 | Church et al. |
| 2019/0203275 A1 | 7/2019 | Frisen et al. |
| 2019/0233878 A1 | 8/2019 | Delaney et al. |
| 2019/0249226 A1 | 8/2019 | Bent et al. |
| 2019/0249248 A1 | 8/2019 | Beechem et al. |
| 2019/0262831 A1 | 8/2019 | West et al. |
| 2019/0264268 A1 | 8/2019 | Frisen et al. |
| 2019/0271030 A1 | 9/2019 | Chee |
| 2019/0271031 A1 | 9/2019 | Chee |
| 2019/0300943 A1 | 10/2019 | Chee et al. |
| 2019/0300944 A1 | 10/2019 | Chee et al. |
| 2019/0300945 A1 | 10/2019 | Chee et al. |
| 2019/0309353 A1 | 10/2019 | Chee |
| 2019/0309354 A1 | 10/2019 | Chee |
| 2019/0309355 A1 | 10/2019 | Chee |
| 2019/0323071 A1 | 10/2019 | Chee |
| 2019/0323088 A1 | 10/2019 | Boutet et al. |
| 2019/0330617 A1 | 10/2019 | Church et al. |
| 2019/0338353 A1 | 11/2019 | Belgrader et al. |
| 2019/0352708 A1 | 11/2019 | Gaige et al. |
| 2019/0367969 A1 | 12/2019 | Belhocine et al. |
| 2019/0367982 A1 | 12/2019 | Belhocine et al. |
| 2019/0367997 A1 | 12/2019 | Bent et al. |
| 2020/0002763 A1 | 1/2020 | Belgrader et al. |
| 2020/0024641 A1 | 1/2020 | Nolan et al. |
| 2020/0047010 A1 | 2/2020 | Lee et al. |
| 2020/0048690 A1 | 2/2020 | Chee |
| 2020/0063191 A1 | 2/2020 | Kennedy-Darling et al. |
| 2020/0063195 A1 | 2/2020 | Chee |
| 2020/0063196 A1 | 2/2020 | Chee |
| 2020/0071751 A1 | 3/2020 | Daugharthy et al. |
| 2020/0080136 A1 | 3/2020 | Zhang et al. |
| 2020/0109443 A1 | 4/2020 | Chee |
| 2020/0131570 A1 | 4/2020 | Berti et al. |
| 2020/0173985 A1 | 6/2020 | Dong et al. |
| 2020/0224244 A1 | 7/2020 | Nilsson et al. |
| 2020/0239946 A1 | 7/2020 | Dewal |
| 2020/0256867 A1 | 8/2020 | Hennek et al. |
| 2020/0277663 A1 | 9/2020 | Iyer |
| 2020/0277664 A1 | 9/2020 | Frenz |
| 2020/0299757 A1 | 9/2020 | Chee et al. |
| 2020/0325531 A1 | 10/2020 | Chee |
| 2020/0362398 A1 | 11/2020 | Kishi et al. |
| 2020/0370095 A1 | 11/2020 | Farmer et al. |
| 2020/0399687 A1 | 12/2020 | Frisen et al. |
| 2020/0407781 A1 | 12/2020 | Schnall-Levin |
| 2021/0010068 A1 | 1/2021 | Chee et al. |
| 2021/0010070 A1 | 1/2021 | Schnall-Levin et al. |
| 2021/0095331 A1 | 4/2021 | Fan et al. |
| 2021/0123040 A1 | 4/2021 | Macosko et al. |
| 2021/0130881 A1 | 5/2021 | Cox |

(56) References Cited

U.S. PATENT DOCUMENTS

| | | |
|---|---|---|
| 2021/0140982 A1 | 5/2021 | Uytingco et al. |
| 2021/0150707 A1 | 5/2021 | Weisenfeld et al. |
| 2021/0155982 A1 | 5/2021 | Yin et al. |
| 2021/0158522 A1 | 5/2021 | Weisenfeld et al. |
| 2021/0172007 A1 | 6/2021 | Chee et al. |
| 2021/0189475 A1 | 6/2021 | Tentori et al. |
| 2021/0190770 A1 | 6/2021 | Delaney et al. |
| 2021/0198741 A1 | 7/2021 | Williams |
| 2021/0199660 A1 | 7/2021 | Williams et al. |
| 2021/0207202 A1 | 7/2021 | Chee |
| 2021/0214785 A1 | 7/2021 | Stoeckius |
| 2021/0222235 A1 | 7/2021 | Chee |
| 2021/0222241 A1 | 7/2021 | Bharadwaj |
| 2021/0222242 A1 | 7/2021 | Ramachandran Iyer |
| 2021/0222253 A1 | 7/2021 | Uytingco |
| 2021/0223227 A1 | 7/2021 | Stoeckius |
| 2021/0230584 A1 | 7/2021 | Mikkelsen et al. |
| 2021/0230681 A1 | 7/2021 | Patterson et al. |
| 2021/0230692 A1 | 7/2021 | Daugharthy et al. |
| 2021/0237022 A1 | 8/2021 | Bava |
| 2021/0238581 A1 | 8/2021 | Mikkelsen et al. |
| 2021/0238664 A1 | 8/2021 | Bava et al. |
| 2021/0238675 A1 | 8/2021 | Bava |
| 2021/0238680 A1 | 8/2021 | Bava |
| 2021/0247316 A1 | 8/2021 | Bava |
| 2021/0255175 A1 | 8/2021 | Chee et al. |
| 2021/0262018 A1 | 8/2021 | Bava et al. |
| 2021/0262019 A1 | 8/2021 | Alvarado Martinez et al. |
| 2021/0269864 A1 | 9/2021 | Chee |
| 2021/0270822 A1 | 9/2021 | Chee |
| 2021/0277460 A1 | 9/2021 | Bava |
| 2021/0285036 A1 | 9/2021 | Yin et al. |
| 2021/0285046 A1 | 9/2021 | Chell et al. |
| 2021/0292748 A1 | 9/2021 | Frisen et al. |
| 2021/0292822 A1 | 9/2021 | Frisen et al. |
| 2021/0317510 A1 | 10/2021 | Chee et al. |
| 2021/0317524 A1 | 10/2021 | Lucero et al. |
| 2021/0324457 A1 | 10/2021 | Ramachandran Iyer et al. |
| 2021/0332424 A1 | 10/2021 | Schnall-Levin |
| 2021/0332425 A1 | 10/2021 | Pfeiffer et al. |
| 2021/0348221 A1 | 11/2021 | Chell et al. |
| 2022/0002791 A1 | 1/2022 | Frisen et al. |
| 2022/0003755 A1 | 1/2022 | Chee |
| 2022/0010367 A1 | 1/2022 | Ramachandran Iyer et al. |
| 2022/0017951 A1 | 1/2022 | Ramachandran Iyer et al. |
| 2022/0025446 A1 | 1/2022 | Shah |
| 2022/0025447 A1 | 1/2022 | Tentori et al. |
| 2022/0033888 A1 | 2/2022 | Schnall-Levin et al. |
| 2022/0049293 A1 | 2/2022 | Frenz et al. |
| 2022/0064630 A1 | 3/2022 | Bent et al. |
| 2022/0081728 A1 | 3/2022 | Williams |
| 2022/0090058 A1 | 3/2022 | Frisen et al. |
| 2022/0090175 A1 | 3/2022 | Uytingco et al. |
| 2022/0090181 A1 | 3/2022 | Gallant et al. |
| 2022/0098576 A1 | 3/2022 | Dadhwal |
| 2022/0098661 A1 | 3/2022 | Chew et al. |
| 2022/0106632 A1 | 4/2022 | Galonska et al. |
| 2022/0106633 A1 | 4/2022 | Engblom et al. |
| 2022/0112486 A1 | 4/2022 | Ramachandran Iyer et al. |
| 2022/0112545 A1 | 4/2022 | Chee |
| 2022/0119869 A1 | 4/2022 | Ramachandran Iyer et al. |
| 2022/0127659 A1 | 4/2022 | Frisen et al. |
| 2022/0127666 A1 | 4/2022 | Katiraee et al. |
| 2022/0127672 A1 | 4/2022 | Stoeckius |
| 2022/0145361 A1 | 5/2022 | Frenz et al. |
| 2022/0154255 A1 | 5/2022 | Chee et al. |
| 2022/0170083 A1 | 6/2022 | Khaled et al. |
| 2022/0195422 A1 | 6/2022 | Gallant et al. |
| 2022/0195505 A1 | 6/2022 | Frisen et al. |
| 2022/0196644 A1 | 6/2022 | Chee |
| 2022/0213526 A1 | 7/2022 | Frisen et al. |
| 2022/0220544 A1 | 7/2022 | Ach et al. |
| 2022/0241780 A1 | 8/2022 | Tentori et al. |
| 2022/0267844 A1 | 8/2022 | Ramachandran Iyer et al. |
| 2022/0282329 A1 | 9/2022 | Chell et al. |
| 2022/0290217 A1 | 9/2022 | Frenz et al. |
| 2022/0290219 A1 | 9/2022 | Chee |
| 2022/0298560 A1 | 9/2022 | Frisen et al. |
| 2022/0325325 A1 | 10/2022 | Chee et al. |
| 2022/0326251 A1 | 10/2022 | Uytingco et al. |
| 2022/0333171 A1 | 10/2022 | Chee |
| 2022/0333191 A1 | 10/2022 | Mikkelsen et al. |
| 2022/0333192 A1 | 10/2022 | Uytingco |
| 2022/0333195 A1 | 10/2022 | Schnall-Levin et al. |
| 2022/0334031 A1 | 10/2022 | Delaney et al. |
| 2022/0348905 A1 | 11/2022 | Dadhwal |
| 2022/0348992 A1 | 11/2022 | Stoeckius et al. |
| 2022/0356464 A1 | 11/2022 | Kim et al. |
| 2022/0364163 A1 | 11/2022 | Stahl et al. |
| 2022/0389491 A1 | 12/2022 | Chee |
| 2022/0389503 A1 | 12/2022 | Mikkelsen et al. |
| 2022/0389504 A1 | 12/2022 | Chew et al. |
| 2022/0403455 A1 | 12/2022 | Ramachandran Iyer et al. |
| 2022/0404245 A1 | 12/2022 | Chell et al. |
| 2023/0002812 A1 | 1/2023 | Stoeckius et al. |
| 2023/0014008 A1 | 1/2023 | Shastry |
| 2023/0017773 A1 | 1/2023 | Kim et al. |
| 2023/0031305 A1 | 2/2023 | Neuta et al. |
| 2023/0033960 A1 | 2/2023 | Gallant et al. |
| 2023/0034039 A1 | 2/2023 | Shahjamali |
| 2023/0034216 A1 | 2/2023 | Bava |
| 2023/0040363 A1 | 2/2023 | Chee |
| 2023/0042088 A1 | 2/2023 | Chee |
| 2023/0042817 A1 | 2/2023 | Mignardi |
| 2023/0047782 A1 | 2/2023 | Tentori et al. |
| 2023/0056549 A1 | 2/2023 | Dadhwal |
| 2023/0064372 A1 | 3/2023 | Chell et al. |
| 2023/0069046 A1 | 3/2023 | Chew et al. |
| 2023/0077364 A1 | 3/2023 | Patterson et al. |
| 2023/0080543 A1 | 3/2023 | Katiraee et al. |
| 2023/0081381 A1 | 3/2023 | Chew et al. |
| 2023/0100497 A1 | 3/2023 | Frisen et al. |
| 2023/0107023 A1 | 4/2023 | Chee |
| 2023/0111225 A1 | 4/2023 | Chew et al. |
| 2023/0113230 A1 | 4/2023 | Kim et al. |
| 2023/0126825 A1 | 4/2023 | Nagendran et al. |
| 2023/0129552 A1 | 4/2023 | Ramachandran Iyer |
| 2023/0135010 A1 | 5/2023 | Tentori et al. |
| 2023/0143569 A1 | 5/2023 | Iyer et al. |
| 2023/0145575 A1 | 5/2023 | Gallant et al. |
| 2023/0147726 A1 | 5/2023 | Hadrup et al. |
| 2023/0151412 A1 | 5/2023 | Chee |
| 2023/0159994 A1 | 5/2023 | Chee |
| 2023/0159995 A1 | 5/2023 | Iyer et al. |
| 2023/0160008 A1 | 5/2023 | Chell et al. |
| 2023/0175045 A1 | 6/2023 | Katsori et al. |
| 2023/0183684 A1 | 6/2023 | Gallant et al. |
| 2023/0183785 A1 | 6/2023 | Frisen et al. |
| 2023/0194469 A1 | 6/2023 | Tentori et al. |
| 2023/0194470 A1 | 6/2023 | Kim et al. |
| 2023/0203478 A1 | 6/2023 | Kim et al. |
| 2023/0212650 A1 | 7/2023 | Chew et al. |
| 2023/0212655 A1 | 7/2023 | Chee |
| 2023/0212656 A1 | 7/2023 | Chow et al. |
| 2023/0220368 A1 | 7/2023 | Kim |
| 2023/0220454 A1 | 7/2023 | Bent et al. |
| 2023/0220455 A1 | 7/2023 | Galonska et al. |
| 2023/0227811 A1 | 7/2023 | Dadhwal |
| 2023/0228762 A1 | 7/2023 | Uytingco et al. |
| 2023/0242973 A1 | 8/2023 | Frisen et al. |
| 2023/0242976 A1 | 8/2023 | Tentori et al. |
| 2023/0265488 A1 | 8/2023 | Gohil et al. |
| 2023/0265489 A1 | 8/2023 | Uytingco et al. |
| 2023/0265491 A1 | 8/2023 | Tentori et al. |
| 2023/0267625 A1 | 8/2023 | Tentori et al. |
| 2023/0279474 A1 | 9/2023 | Katiraee |
| 2023/0279477 A1 | 9/2023 | Kvastad et al. |
| 2023/0279481 A1 | 9/2023 | Marrache et al. |
| 2023/0287399 A1 | 9/2023 | Gallant et al. |
| 2023/0287475 A1 | 9/2023 | Chell et al. |
| 2023/0287481 A1 | 9/2023 | Katsori et al. |
| 2023/0295699 A1 | 9/2023 | Sukovich et al. |
| 2023/0295722 A1 | 9/2023 | Bharadwaj |
| 2023/0304072 A1 | 9/2023 | Gohil et al. |

(56) References Cited

U.S. PATENT DOCUMENTS

| | | |
|---|---|---|
| 2023/0304074 A1 | 9/2023 | Chee et al. |
| 2023/0304078 A1 | 9/2023 | Frisen et al. |
| 2023/0313279 A1 | 10/2023 | Giacomello et al. |
| 2023/0323340 A1 | 10/2023 | Dadhwal |
| 2023/0323434 A1 | 10/2023 | Yin et al. |
| 2023/0323436 A1 | 10/2023 | Chee |
| 2023/0323447 A1 | 10/2023 | Schnall-Levin et al. |
| 2023/0323453 A1 | 10/2023 | Stoeckius |
| 2023/0332138 A1 | 10/2023 | Kim et al. |
| 2023/0332211 A1 | 10/2023 | Chee |
| 2023/0332212 A1 | 10/2023 | Chew et al. |
| 2023/0332227 A1 | 10/2023 | Ramachandran Iyer |
| 2023/0332247 A1 | 10/2023 | Singh et al. |
| 2023/0351619 A1 | 11/2023 | Tentori et al. |
| 2023/0358733 A1 | 11/2023 | Chee |
| 2023/0366008 A1 | 11/2023 | Chew et al. |
| 2023/0383285 A1 | 11/2023 | Kim et al. |
| 2023/0383344 A1 | 11/2023 | Stoeckius |
| 2023/0392204 A1 | 12/2023 | Chell et al. |
| 2023/0393071 A1 | 12/2023 | Bava |
| 2023/0407404 A1 | 12/2023 | Baumgartner et al. |
| 2023/0416807 A1 | 12/2023 | Chee |
| 2023/0416808 A1 | 12/2023 | Sukovich et al. |
| 2023/0416850 A1 | 12/2023 | Singh et al. |
| 2024/0002931 A1 | 1/2024 | Bava |
| 2024/0011081 A1 | 1/2024 | Chee |
| 2024/0011090 A1 | 1/2024 | Chew et al. |
| 2024/0018572 A1 | 1/2024 | Mignardi |
| 2024/0018575 A1 | 1/2024 | Gallant et al. |
| 2024/0018589 A1 | 1/2024 | Schnall-Levin et al. |
| 2024/0026445 A1 | 1/2024 | Ramachandran Iyer et al. |
| 2024/0033743 A1 | 2/2024 | Tentori et al. |
| 2024/0035937 A1 | 2/2024 | Cox et al. |
| 2024/0043908 A1 | 2/2024 | Chew et al. |
| 2024/0043925 A1 | 2/2024 | Bent et al. |
| 2024/0052343 A1 | 2/2024 | Gallant et al. |
| 2024/0053351 A1 | 2/2024 | Uytingco et al. |
| 2024/0060115 A1 | 2/2024 | Chee et al. |
| 2024/0067953 A1 | 2/2024 | Mikkelsen et al. |
| 2024/0068016 A1 | 2/2024 | Frisen et al. |
| 2024/0068017 A1 | 2/2024 | Lundeberg et al. |
| 2024/0076723 A1 | 3/2024 | Mignardi |
| 2024/0080346 A1 | 3/2024 | Engblom et al. |
| 2024/0084365 A1 | 3/2024 | Frisen et al. |
| 2024/0084366 A1 | 3/2024 | Chee |
| 2024/0084383 A1 | 3/2024 | Ramachandran Iyer et al. |
| 2024/0093274 A1 | 3/2024 | Frisen et al. |
| 2024/0093290 A1 | 3/2024 | Stahl et al. |
| 2024/0110228 A1 | 4/2024 | Uytingco et al. |
| 2024/0124933 A1 | 4/2024 | Chell et al. |
| 2024/0125772 A1 | 4/2024 | Delaney et al. |
| 2024/0141327 A1 | 5/2024 | Kim et al. |
| 2024/0158838 A1 | 5/2024 | Alvarado Martinez et al. |
| 2024/0175080 A1 | 5/2024 | Galonska et al. |
| 2024/0182968 A1 | 6/2024 | Bava |
| 2024/0191286 A1 | 6/2024 | Boutet et al. |
| 2024/0200121 A1 | 6/2024 | Boutet |
| 2024/0209425 A1 | 6/2024 | Yin et al. |
| 2024/0218427 A1 | 7/2024 | Sukovich et al. |
| 2024/0218432 A1 | 7/2024 | Mielinis |
| 2024/0219701 A1 | 7/2024 | Tentori et al. |
| 2024/0253036 A1 | 8/2024 | Kim et al. |
| 2024/0263218 A1 | 8/2024 | Katiraee et al. |
| 2024/0271190 A1 | 8/2024 | Stoeckius et al. |
| 2024/0271195 A1 | 8/2024 | Mikhaiel et al. |
| 2024/0279747 A1 | 8/2024 | Williams |
| 2024/0287600 A1 | 8/2024 | Iyer et al. |
| 2024/0294971 A1 | 9/2024 | Galonska |
| 2024/0294974 A1 | 9/2024 | Galonska et al. |
| 2024/0294975 A1 | 9/2024 | Lin et al. |
| 2024/0301488 A1 | 9/2024 | Stoeckius |
| 2024/0301489 A1 | 9/2024 | Chew et al. |
| 2024/0360494 A1 | 10/2024 | Costa et al. |
| 2024/0368711 A1 | 11/2024 | Giacomello et al. |
| 2024/0377297 A1 | 11/2024 | Cox et al. |
| 2024/0385088 A1 | 11/2024 | Kim et al. |
| 2024/0392349 A1 | 11/2024 | Frisen et al. |
| 2024/0392351 A1 | 11/2024 | Chee |
| 2024/0392352 A1 | 11/2024 | Stahl et al. |
| 2024/0392353 A1 | 11/2024 | Engblom et al. |
| 2024/0401109 A1 | 12/2024 | Kim et al. |
| 2024/0401117 A1 | 12/2024 | Bava |
| 2024/0401118 A1 | 12/2024 | Tentori et al. |
| 2024/0404301 A1 | 12/2024 | Li et al. |
| 2024/0408593 A1 | 12/2024 | Kim et al. |
| 2024/0416315 A1 | 12/2024 | Bava |
| 2024/0417783 A1 | 12/2024 | Chew et al. |
| 2024/0417784 A1 | 12/2024 | Sukovich et al. |
| 2025/0002980 A1 | 1/2025 | Tentori et al. |
| 2025/0002982 A1 | 1/2025 | Stoeckius et al. |
| 2025/0003956 A1 | 1/2025 | Delaney et al. |
| 2025/0019689 A1 | 1/2025 | Galonska et al. |
| 2025/0019749 A1 | 1/2025 | Katiraee et al. |
| 2025/0066762 A1 | 2/2025 | Man et al. |
| 2025/0066770 A1 | 2/2025 | Costa |
| 2025/0073719 A1 | 3/2025 | Cox et al. |
| 2025/0075261 A1 | 3/2025 | Kim |
| 2025/0101501 A1 | 3/2025 | Chee |
| 2025/0101502 A1 | 3/2025 | Chee |
| 2025/0101504 A1 | 3/2025 | Nagendran et al. |
| 2025/0122564 A1 | 4/2025 | Mignardi et al. |
| 2025/0122565 A1 | 4/2025 | Schnall-Levin et al. |
| 2025/0129412 A1 | 4/2025 | Uytingco et al. |
| 2025/0129421 A1 | 4/2025 | Schnall-Levin et al. |
| 2025/0137043 A1 | 5/2025 | Tentori |
| 2025/0145984 A1 | 5/2025 | Ma et al. |
| 2025/0146057 A1 | 5/2025 | Schnall-Levin et al. |
| 2025/0146058 A1 | 5/2025 | Tentori |
| 2025/0146071 A1 | 5/2025 | Schnall-Levin et al. |
| 2025/0146072 A1 | 5/2025 | Schnall-Levin et al. |
| 2025/0154565 A1 | 5/2025 | Chee |
| 2025/0154566 A1 | 5/2025 | Chee |
| 2025/0154567 A1 | 5/2025 | Chee |
| 2025/0154568 A1 | 5/2025 | Frisen et al. |
| 2025/0154569 A1 | 5/2025 | Stoeckius et al. |
| 2025/0154571 A1 | 5/2025 | Ramachandran Iyer et al. |
| 2025/0154588 A1 | 5/2025 | Ramachandran Iyer et al. |
| 2025/0155446 A1 | 5/2025 | Uytingco et al. |
| 2025/0163501 A1 | 5/2025 | Singh et al. |
| 2025/0163509 A1 | 5/2025 | Daugharthy et al. |
| 2025/0171833 A1 | 5/2025 | Frisen et al. |
| 2025/0171848 A1 | 5/2025 | Chell et al. |
| 2025/0179475 A1 | 6/2025 | Borgstrom et al. |
| 2025/0182305 A1 | 6/2025 | Tentori et al. |
| 2025/0182503 A1 | 6/2025 | Li et al. |
| 2025/0188526 A1 | 6/2025 | Sukovich et al. |
| 2025/0189483 A1 | 6/2025 | Kim et al. |
| 2025/0197847 A1 | 6/2025 | Kim et al. |
| 2025/0197938 A1 | 6/2025 | Bjorninen |
| 2025/0207125 A1 | 6/2025 | Gupta et al. |
| 2025/0207182 A1 | 6/2025 | Chee |
| 2025/0207183 A1 | 6/2025 | Chee |
| 2025/0207195 A1 | 6/2025 | Chell et al. |
| 2025/0208115 A1 | 6/2025 | Bent |
| 2025/0215482 A1 | 7/2025 | Mignardi et al. |
| 2025/0215484 A1 | 7/2025 | Ramachandran Iyer et al. |
| 2025/0216300 A1 | 7/2025 | Delaney et al. |
| 2025/0216303 A1 | 7/2025 | Cox et al. |
| 2025/0223633 A1 | 7/2025 | Frenz et al. |
| 2025/0230487 A1 | 7/2025 | Chee et al. |
| 2025/0230498 A1 | 7/2025 | Katiraee |
| 2025/0250621 A1 | 8/2025 | Galonska et al. |
| 2025/0250632 A1 | 8/2025 | Mignardi et al. |
| 2025/0257393 A1 | 8/2025 | Katiraee et al. |
| 2025/0263791 A1 | 8/2025 | Bava |
| 2025/0264411 A1 | 8/2025 | Bava |
| 2025/0283154 A1 | 9/2025 | Iyer et al. |
| 2025/0283157 A1 | 9/2025 | Uytingco et al. |
| 2025/0297308 A1 | 9/2025 | Tentori |

(56) References Cited

U.S. PATENT DOCUMENTS

| | | |
|---|---|---|
| 2025/0313890 A1 | 10/2025 | Lundeberg et al. |
| 2025/0313892 A1 | 10/2025 | Stoeckius |

FOREIGN PATENT DOCUMENTS

| | | |
|---|---|---|
| EP | 1923471 | 5/2008 |
| EP | 2002017 | 12/2008 |
| EP | 2130913 | 12/2009 |
| EP | 2881465 | 6/2015 |
| EP | 3013984 | 5/2016 |
| EP | 3511423 | 7/2019 |
| EP | 3541956 | 9/2019 |
| WO | WO 1989/010977 | 11/1989 |
| WO | WO 1991/006678 | 5/1991 |
| WO | WO 1995/025116 | 9/1995 |
| WO | WO 1995/035505 | 12/1995 |
| WO | WO 2000/063437 | 10/2000 |
| WO | WO 2002/059355 | 8/2002 |
| WO | WO 2002/077283 | 10/2002 |
| WO | WO 2003/002979 | 1/2003 |
| WO | WO 2003/010176 | 2/2003 |
| WO | WO 2005/007814 | 1/2005 |
| WO | WO 2007/073171 | 6/2007 |
| WO | WO 2007/076726 | 7/2007 |
| WO | WO 2007/145612 | 12/2007 |
| WO | WO 2008/075086 | 6/2008 |
| WO | WO 2009/032167 | 3/2009 |
| WO | WO 2009/152928 | 12/2009 |
| WO | WO 2010/088517 | 8/2010 |
| WO | WO 2010/126614 | 11/2010 |
| WO | WO 2011/068088 | 6/2011 |
| WO | WO 2012/159089 | 11/2012 |
| WO | WO 2013/123442 | 8/2013 |
| WO | WO 2013/131962 | 9/2013 |
| WO | WO 2013/138510 | 9/2013 |
| WO | WO 2013/150082 | 10/2013 |
| WO | WO 2013/150083 | 10/2013 |
| WO | WO 2014/060483 | 4/2014 |
| WO | WO 2014/200767 | 12/2014 |
| WO | WO 2014/210223 | 12/2014 |
| WO | WO 2014/210353 | 12/2014 |
| WO | WO 2015/031691 | 3/2015 |
| WO | WO 2016/138496 | 9/2016 |
| WO | WO 2016/138500 | 9/2016 |
| WO | WO 2016/162309 | 10/2016 |
| WO | WO 2016/166128 | 10/2016 |
| WO | WO 2016/168825 | 10/2016 |
| WO | WO 2017/019456 | 2/2017 |
| WO | WO 2017/027367 | 2/2017 |
| WO | WO 2017/075293 | 5/2017 |
| WO | WO 2017/096158 | 7/2017 |
| WO | WO 2018/064640 | 4/2018 |
| WO | WO 2018/091676 | 5/2018 |
| WO | WO 2018/148700 | 8/2018 |
| WO | WO 2018/175779 | 9/2018 |
| WO | WO 2019/213254 | 11/2019 |
| WO | WO 2019/213294 | 11/2019 |
| WO | WO 2020/028194 | 2/2020 |
| WO | WO 2020/047002 | 3/2020 |
| WO | WO 2020/047010 | 3/2020 |
| WO | WO 2020/053655 | 3/2020 |
| WO | WO 2020/061064 | 3/2020 |
| WO | WO 2020/061066 | 3/2020 |
| WO | WO 2020/061108 | 3/2020 |
| WO | WO 2020/076979 | 4/2020 |
| WO | WO 2020/099640 | 5/2020 |
| WO | WO 2020/112604 | 6/2020 |
| WO | WO 2020/123301 | 6/2020 |
| WO | WO 2020/123305 | 6/2020 |
| WO | WO 2020/123311 | 6/2020 |
| WO | WO 2020/123316 | 6/2020 |
| WO | WO 2020/123317 | 6/2020 |
| WO | WO 2020/123318 | 6/2020 |
| WO | WO 2020/123319 | 6/2020 |
| WO | WO 2020/123320 | 7/2020 |
| WO | WO 2020/160044 | 8/2020 |
| WO | WO 2020/167862 | 8/2020 |
| WO | WO 2020/176788 | 9/2020 |
| WO | WO 2020/176882 | 9/2020 |
| WO | WO 2020/190509 | 9/2020 |
| WO | WO 2020/198071 | 10/2020 |
| WO | WO 2020/206285 | 10/2020 |
| WO | WO 2020/243579 | 12/2020 |
| WO | WO 2021/041974 | 3/2021 |
| WO | WO 2021/067246 | 4/2021 |
| WO | WO 2021/067514 | 4/2021 |
| WO | WO 2021/102003 | 5/2021 |
| WO | WO 2021/102005 | 5/2021 |
| WO | WO 2021/102039 | 5/2021 |
| WO | WO 2021/116715 | 6/2021 |
| WO | WO 2021/133842 | 7/2021 |
| WO | WO 2021/133845 | 7/2021 |
| WO | WO 2021/133849 | 7/2021 |
| WO | WO 2021/142233 | 7/2021 |
| WO | WO 2021/168261 | 8/2021 |
| WO | WO 2021/168278 | 8/2021 |
| WO | WO 2021/207610 | 10/2021 |
| WO | WO 2021/216708 | 10/2021 |
| WO | WO 2021/225900 | 11/2021 |
| WO | WO 2021/236625 | 11/2021 |
| WO | WO 2021/236929 | 11/2021 |
| WO | WO 2021/237056 | 11/2021 |
| WO | WO 2021/237087 | 11/2021 |
| WO | WO 2021/242834 | 12/2021 |
| WO | WO 2021/247543 | 12/2021 |
| WO | WO 2021/247568 | 12/2021 |
| WO | WO 2021/247593 | 12/2021 |
| WO | WO 2021/252499 | 12/2021 |
| WO | WO 2021/252576 | 12/2021 |
| WO | WO 2021/252591 | 12/2021 |
| WO | WO 2021/252747 | 12/2021 |
| WO | WO 2021/263111 | 12/2021 |
| WO | WO 2022/025965 | 2/2022 |
| WO | WO 2022/060798 | 3/2022 |
| WO | WO 2022/060953 | 3/2022 |
| WO | WO 2022/061150 | 3/2022 |
| WO | WO 2022/061152 | 3/2022 |
| WO | WO 2022/087273 | 4/2022 |
| WO | WO 2022/099037 | 5/2022 |
| WO | WO 2022/103712 | 5/2022 |
| WO | WO 2022/109181 | 5/2022 |
| WO | WO 2022/132645 | 6/2022 |
| WO | WO 2022/140028 | 6/2022 |
| WO | WO 2022/147005 | 7/2022 |
| WO | WO 2022/147296 | 7/2022 |
| WO | WO 2022/164615 | 8/2022 |
| WO | WO 2022/178267 | 8/2022 |
| WO | WO 2022/198068 | 9/2022 |
| WO | WO 2022/221425 | 10/2022 |
| WO | WO 2022/226057 | 10/2022 |
| WO | WO 2022/236054 | 11/2022 |
| WO | WO 2022/243303 | 11/2022 |
| WO | WO 2022/226372 | 12/2022 |
| WO | WO 2022/256503 | 12/2022 |
| WO | WO 2022/271820 | 12/2022 |
| WO | WO 2023/287765 | 1/2023 |
| WO | WO 2023/018799 | 2/2023 |
| WO | WO 2023/034489 | 3/2023 |
| WO | WO 2023/044071 | 3/2023 |
| WO | WO 2023/076345 | 5/2023 |
| WO | WO 2023/086880 | 5/2023 |
| WO | WO 2023/102118 | 6/2023 |
| WO | WO 2023/122033 | 6/2023 |
| WO | WO 2023/150098 | 8/2023 |
| WO | WO 2023/150163 | 8/2023 |
| WO | WO 2023/150171 | 8/2023 |
| WO | WO 2023/215552 | 11/2023 |
| WO | WO 2023/225519 | 11/2023 |
| WO | WO 2023/229988 | 11/2023 |
| WO | WO 2023/250077 | 12/2023 |
| WO | WO 2024/015578 | 1/2024 |
| WO | WO 2024/035844 | 2/2024 |
| WO | WO 2024/081212 | 4/2024 |
| WO | WO 2024/086167 | 4/2024 |

(56) References Cited

FOREIGN PATENT DOCUMENTS

| WO | WO 2024/086776 | 4/2024 |
|---|---|---|
| WO | WO 2024/102809 | 5/2024 |
| WO | WO 2024/137826 | 6/2024 |
| WO | WO 2024/145224 | 7/2024 |
| WO | WO 2024/145441 | 7/2024 |
| WO | WO 2024/145445 | 7/2024 |
| WO | WO 2024/145491 | 7/2024 |
| WO | WO 2024/206603 | 10/2024 |
| WO | WO 2024/220882 | 10/2024 |
| WO | WO 2024/238900 | 11/2024 |
| WO | WO 2024/254316 | 12/2024 |
| WO | WO 2025/029605 | 2/2025 |
| WO | WO 2025/029627 | 2/2025 |
| WO | WO 2025/043076 | 2/2025 |
| WO | WO 2025/072119 | 4/2025 |
| WO | WO 2025/090912 | 5/2025 |
| WO | WO 2025/096581 | 5/2025 |
| WO | WO 2025/101864 | 5/2025 |

OTHER PUBLICATIONS

Manning et al. Benefits and pitfalls of secondary antibodies: why choosing the right secondary is of primary importance. PLoS One. 2012;7(6):e38313. (Year: 2012).*

Webb et al. Epi-Fluorescence Microscopy. In: Taatjes, D., Roth, J. (eds) Cell Imaging Techniques. Methods in Molecular Biology, 2012, vol. 931, pp. 29-59. Humana Press, Totowa, NJ. (Year: 2012).*

Lubeck et al. Single-cell systems biology by super-resolution imaging and combinatorial labeling. Nat Methods. Jun. 3, 2012;9(7):743-8. (Year: 2012).*

Vasaturo et al. Multiplexed immunohistochemistry for immune cell phenotyping, quantification and spatial distribution in situ. Methods Enzymol. 2020;635:51-66. Epub Nov. 4, 2019. (Year: 2019).*

10xGenomics.com, [online], "Visium Spatial Gene Expression Reagent Kits—User Guide," Jan. 2022, retrieved on Jun. 27, 2024, retrieved from URL<https://web.archive.org/web/20230326192142/https://www.10xgenomics.com/support/spatial-gene-expression-fresh-frozen/documentation/steps/library-construction/visium-spatial-gene-expression-reagent-kits-user-guide>, 71 pages.

U.S. Appl. No. 16/353,937, filed Mar. 14, 2019, Frisen et al.
U.S. Appl. No. 16/876,709, filed May 18, 2020, Schnall-Levin et al.
U.S. Appl. No. 17/707,189, filed Mar. 29, 2022, Chell et al.
U.S. Appl. No. 61/902,105, filed Nov. 8, 2013, Kozlov et al.

[No Author Listed], "Chromium Next GEM Single Cell 3' Reagent Kits v3.1—User Guide," 10x Genomics, Document No. CG000204, Nov. 2019, 58 pages.

[No Author Listed], "Chromium Next GEM Single Cell 3' Reagent Kits v3.1 (Dual Index)—User Guide," 10x Genomics, Mar. 2021, Document No. CG000315, 61 pages.

[No Author Listed], "HuSNP Mapping Assay User's Manual," Affymetrix Part No. 90094 (Affymetrix, Santa Clara, Calif.), GeneChip, 2000, 104 pages.

[No Author Listed], "Microarray technologies have excellent possibilities in genomics-related researches," Science Tools From Amersham Pharmacia Biotech, 1998, 3(4): 8 pages (with English Translation).

10xGenomics.com, [online], "Visium Spatial Gene Expression Reagent Kits—Tissue Optimization—User Guide," Jul. 2020, retrieved on May 25, 2021, retrieved from URL<https://assets.ctfassets.net/an68im79xiti/5UJrNOCH17rEkOUXwd19It/e54d99fb08a8f1500aba503005a04a56/CG000238_VisiumSpatialTissueOptimizationUserGuide_RevD.pdf>, 42 pages.

10xGenomics.com, [online], "Visium Spatial Gene Expression Reagent Kits—Tissue Optimization," Nov. 2019, retrieved on Jan. 25, 2022, retrieved from URL<https://assets.ctfassets.net/an68im79xiti/4q03w6959AJFxffSw5lee9/6a2ac61cf6388a72564eeb96bc294967/CG000238_VisiumSpatialTissueOptimizationUserGuide_Rev_A.pdf>, 46 pages.

10xGenomics.com, [online], "Visium Spatial Gene Expression Reagent Kits—Tissue Optimization," Oct. 2020, retrieved on Dec. 28, 2021, retrieved from URL<https://assets.ctfassets.net/an68im79xiti/5UJrNOCH17rEkOUXwd19It/e54d99fb08a8f1500aba503005a04a56/CG000238_VisiumSpatialTissueOptimizationUserGuide_RevD.pdf>, 43 pages.

10xGenomics.com, [online], "Visium Spatial Gene Expression Reagent Kits—User Guide," Jun. 2020, retrieved on May 25, 2021, retrieved from URL<https://assets.ctfassets.net/an68im79xiti/3GGIfH3RWpd1bFVhalpexR/8baa08d9007157592b65b2cdc7130990/CG000239_VisiumSpatialGeneExpression_UserGuide_RevD.pdf>, 69 pages.

10xGenomics.com, [online], "Visium Spatial Gene Expression Reagent Kits—User Guide," Oct. 2020, retrieved on Dec. 28, 2021, retrieved from URL<https://assets.ctfassets.net/an68im79xiti/3GGIfH3RWpd1bFVhalpexR/8baa08d9007157592b65b2cdc7130990/CG000239_VisiumSpatialGeneExpression_UserGuide_RevD.pdf>, 70 pages.

Adessi et al., "Solid phase DNA amplification: characterisation of primer attachment and amplification mechanisms," Nucl. Acids Res., 2000, 28(20):E87, 8 pages.

Affymetrix, "GeneChip Human Genome U133 Set," retrieved from the Internet: on the World Wide Web at affymetrix.com/support/technical/datasheets/hgu133_datasheet.pdf, retrieved on Feb. 26, 2003, 2 pages.

Affymetrix, "Human Genome U95Av2," Internet Citation, retrieved from the internet: on the World Wide Web affymetrix.com, retrieved on Oct. 2, 2002, 1 page.

Albretsen et al., "Applications of magnetic beads with covalently attached oligonucleotides in hybridization: Isolation and detection of specific measles virus mRNA from a crude cell lysate," Anal. Biochem., 1990, 189(1):40-50.

Allawi et al., "Thermodynamics and NMR of Internal GâT Mismatches in DNA," Biochemistry, 1996, 36(34):10581-10594.

Armani et al, "2D-PCR: a method of mapping DNA in tissue sections," Lab Chip, 2009, 9(24):3526-34.

Asp et al., "Spatially Resolved Transcriptomes-Next Generation Tools for Tissue Exploration," Bioessays, Oct. 2020, 42(10):e1900221, 16 pages.

Atkinson et al., "An Updated Protocol for High Throughput Plant Tissue Sectioning," Front Plant Sci, 2017, 8:1721, 8 pages.

Atkinson, "Overview of Translation: Lecture Manuscript," U of Texas, 2000, DD, pp. 6.1-6.8.

Bains et al., "A novel method for nucleic acid sequence determination," Journal of Theoretical Biology, 1988, 135(3), 303-7.

Barnes, "PCR amplification of up to 35-kb DNA with high fidelity and high yield from lambda bacteriophage templates," Proc. Natl. Acad. Sci USA, 1994, 91(6):2216-2220.

Beattie et al., "Advances in genosensor research," Clin Chem., May 1995, 41(5):700-6.

Beechem et al., "High-Plex Spatially Resolved RNA and Protein Detection Using Digital Spatial Profiling: A Technology Designed for Immuno-oncology Biomarker Discovery and Translational Research," Methods Mol Biol, 2020, Chapter 25, 2055:563-583.

Bergenstråhle et al., "Seamless integration of image and molecular analysis for spatial transcriptomics workflows," BMC Genomics, Jul. 2020, 21(1):482, 7 pages.

Birney et al., "Identification and analysis of functional elements in 1% of the human genome by the Encode pilot project," Nature, 2007, 447(7146):799-816.

Blanchard et al., "High-density oligonucleotide arrays," Biosensors & Bioelectronics, 1996, 11(6-7):687-690.

Blokzijl et al., "Profiling protein expression and interactions: proximity ligation as a tool for personalized medicine," J Intern. Med., 2010, 268(3):232-245.

Blow, "Tissue Issues," Nature, 2007, 448(7156):959-962.

Bolotin et al., "MiXCR: software for comprehensive adaptive immunity profiling," Nat Methods., May 2015, 12(5):380-1.

Brandon et al., "Mitochondrial mutations in cancer," Oncogene, 2006, 25(34):4647-4662.

Brenner et al., "Gene expression analysis by massively parallel signature sequencing (MPSS) on microbead arrays," Nat. Biotech., 2000, 18(6):630-634.

(56) References Cited

OTHER PUBLICATIONS

Brenner et al., "In vitro cloning of complex mixtures of DNA on microbeads: physical separation of differentially expressed cDNAs," Proc. Natl. Acad. Sci. USA, 2000, 97(4):1665-1670.
Brow, "35—The Cleavase I enzyme for mutation and polymorphism scanning," PCR Applications Protocols for Functional Genomics, 1999, pp. 537-550.
Brown et al., "Retroviral integration: structure of the initial covalent product and its precursor, and a role for the viral IN protein," Proc Natl Acad Sci USA, Apr. 1989, 86(8):2525-9.
Buenrostro et al., "Transposition of native chromatin for multimodal regulatory analysis and personal epigenomics," Nat Methods, Dec. 2013, 10(12):1213-1218.
Bullard et al., "Direct comparison of nick-joining activity of the nucleic acid ligases from bacteriophage T4," Biochem. J. 2006, 398(1):135-144.
Burgess, "A space for transcriptomics," Nature Reviews Genetics, 2016, 17(8):436-7.
Burgess, "Finding structure in gene expression," Nature Reviews Genetics, 2018, 19(5):249, 1 page.
Burgess, "Spatial transcriptomics coming of age," Nat Rev Genet., Jun. 2019, 20(6):317, 1 page.
Burton et al., "Coverslip Mounted-Immersion Cycled in Situ RT-PCR for the Localization of mRNA in Tissue Sections," Biotechniques, 1998, 24(1):92-100.
Cha et al., "Specificity, efficiency, and fidelity of PCR," Genome Res., 1993, 3(3):S18-29.
Chandra et al., "Cell-free synthesis-based protein microarrays and their applications," Proteomics, 2009, 5(6):717-30.
Chatterjee et al., "Mitochondrial DNA mutations in human cancer. Oncogene," 2006, 25(34):4663-4674.
Chen et al., "RNA imaging. Spatially resolved, highly multiplexed RNA profiling in single cells," Science, Apr. 2015, 348(6233):aaa6090, 21 pages.
Chen et al., "Spatial Transcriptomics and in Situ Sequencing to Study Alzheimer's Disease," Cell, Aug. 2020, 182(4):976-991.
Chen et al., "μCB-seq: microfluidic cell barcoding and sequencing for high-resolution imaging and sequencing of single cells," Lab Chip, Nov. 2020, 20(21):3899-3913.
Constantine et al., "Use of genechip high-density oligonucleotide arrays for gene expression monitoring," Life Science News, Amersham Life Science, 1998, pp. 11-14.
Credle et al., "Multiplexed analysis of fixed tissue RNA using Ligation in situ Hybridization," Nucleic Acids Research, 2017, 45(14):e128, 9 pages.
Crosetto et al., "Spatially resolved transcriptomics and beyond," Nature Review Genetics, 2015, 16(1):57-66.
Czarnik, "Encoding methods for combinatorial chemistry," Curr Opin Chem Biol., Jun. 1997, 1(1):60-6.
Dahl et al., "Circle-to-circle amplification for precise and sensitive DNA analysis," Proc. Natl. Acad. Sci., 2004, 101(13):4548-4553.
Dalma-Weiszhausz et al., "The affymetrix GeneChip platform: an overview," Methods Enzymol., 2006, 410:3-28.
Daubendiek et al., "Rolling-Circle RNA Synthesis: Circular Oligonucleotides as Efficient Substrates for T7 RNA Polymerase," J. Am. Chem. Soc., 1995, 117(29):7818-7819.
Davies et al., "How best to identify chromosomal interactions: a comparison of approaches," Nat. Methods, 2017, 14(2):125-134.
Dean et al., "Comprehensive human genome amplification using multiple displacement amplification," Proc Natl. Acad. Sci. USA, 2002, 99(8):5261-66.
Duncan et al., "Affinity chromatography of a sequence-specific DNA binding protein using Teflon-linked oligonucleotides," Anal. Biochem., 1988, 169(1):104-108.
Eguiluz et al., "Multitissue array review: a chronological description of tissue array techniques, applications and procedures," Pathology Research and Practice, 2006, 202(8):561-568.
Eldridge et al., "An in vitro selection strategy for conferring protease resistance to ligand binding peptides," Protein Eng Des Sel., 2009, 22(11):691-698.

Ellington et al., "Antibody-based protein multiplex platforms: technical and operational challenges," Clin Chem, 2010, 56(2):186-193.
Fire et al., "Rolling replication of short DNA circles," Proc. Natl. Acad. Sci., 1995, 92(10):4641-4645.
Flanigon et al., "Multiplex protein detection with DNA readout via mass spectrometry," N. Biotechnol., 2013, 30(2):153-158.
Fodor et al., "Light-directed, spatially addressable parallel chemical synthesis," Science, 1995, 251(4995):767-773.
Forster et al., "A human gut bacterial genome and culture collection for improved metagenomic analyses," Nature Biotechnology, 2019, 37(2):186-192.
Fredriksson et al., "Protein detection using proximity-dependent DNA ligation assays," Nature Biotech., 20: 473-77, 2002.
Frese et al., "Formylglycine aldehyde Tag—protein engineering through a novel post-translational modification," ChemBioChem., 2009, 10(3):425-27.
Fu et al., "Continuous Polony Gels for Tissue Mapping with High Resolution and RNA Capture Efficiency," bioRxiv, 2021, 20 pages.
Fu et al., "Counting individual DNA molecules by the stochastic attachment of diverse labels," PNAS, 2011, 108(22):9026-9031.
Fullwood et al., "Next-generation DNA sequencing of paired-end tags (PET) for transcriptome and genome analyses," Genome Res., 2009, 19(4):521-532.
Ganguli et al., "Pixelated spatial gene expression analysis from tissue," Nat Commun., Jan. 2018, 9(1):202, 9 pages.
Gao et al., "Q&A: Expansion microscopy," BMC Biology, 15:50, 9 pages, 2017.
Gene@arrays[online], BeadArray Technology, available on or before Feb. 14, 2015, via Internet Archive: Wayback Machine URL <https://web.archive.org/web/20150214084616/http://genearrays.com/services/microarrays/illumina/beadarray-technology/>, [retrieved on Jan. 30, 2020], 3 pages.
Gnanapragasam, "Unlocking the molecular archive: the emerging use of formalin-fixed paraffin-embedded tissue for biomarker research in urological cancer," BJU International, 2009, 105(2):274-278.
Goldkorn et al., "A simple and efficient enzymatic method for covalent attachment of DNA to cellulose. Application for hybridization-restriction analysis and for in vitro synthesis of DNA probes," Nucleic Acids Res., 1986, 14(22):9171-9191.
Gracia Villacampa et al., "Genome-wide Spatial Expression Profiling in FFPE Tissues," bioRxiv, 2020, pp. 38 pages.
Gunderson et al., "Decoding randomly ordered DNA arrays," Genome Research, 2004, 14(5):870-877.
Guo et al., "Direct fluorescence analysis of genetic polymorphisms by hybridization with oligonucleotide arrays on glass supports," Nucleic Acids Res., Dec. 1994, 22(24):5456-65.
Gupta et al., "Single-cell isoform RNA sequencing characterizes isoforms in thousands of cerebellar cells," Nature Biotechnol., Oct. 2018, 36:1197-1202.
Hamaguchi et al., "Direct reverse transcription-PCR on oligo(dT)-immobilized polypropylene microplates after capturing total mRNA from crude cell lysates," Clin Chem., Nov. 1998, 44(11):2256-63.
Hayes et al., "Electrophoresis of proteins and nucleic acids: I-Theory," BMJ, Sep. 1989, 299(6703):843-6.
He et al., "In situ synthesis of protein arrays," Current Opinion in Biotechnology, 2008, 19(1):4-9.
He et al., "Printing protein arrays from DNA arrays," Nature Methods, 2008, 5(2):175-77.
He, "Cell-free protein synthesis: applications in proteomics and biotechnology," New Biotechnology, 2008, 25(2-3):126-132.
Hejatko et al., "In situ hybridization technique for mRNA detection in whole mount *Arabidopsis* samples," Nature Protocols, 2006, 1(4):1939-1946.
Hiatt et al., "Parallel, tag-directed assembly of locally derived short sequence reads," Nature Methods, 2010, 7(2):119-25.
Hua et al., "Multi-level transcriptome sequencing identifies COL1A1 as a candidate marker in human heart failure progression," BMC Med., Jan. 2020, 18(1):2, 16 pages.
Jamur et al., "Permeabilization of cell membranes.," Method Mol. Biol., 2010, 588:63-66.
Jemt et al., "An automated approach to prepare tissue-derived spatially barcoded RNA-sequencing libraries," Scientific Reports, 2016, 6:37137, 10 pages.

(56) References Cited

OTHER PUBLICATIONS

Kapteyn et al., "Incorporation of non-natural nucleotides into template-switching oligonucleotides reduces background and improves cDNA synthesis from very small RNA samples," BMC Genomics, Jul. 2010, 11:413, 9 pages.
Korbel et al., "Paired-end mapping reveals extensive structural variation in the human genome," Science, 2007, 318(5849):420-426.
Kozlov et al., "A highly scalable peptide-based assay system for proteomics," PLoS ONE, 2012, 7(6):e37441, 10 pages.
Kristensen et al., "High-Throughput Methods for Detection of Genetic Variation," BioTechniques, Feb. 2001, 30(2):318-332.
Kurz et al., "cDNA—protein fusions: covalent protein—gene conjugates for the in vitro selection of peptides and proteins," ChemBioChem., 2001, 2(9):666-72.
Kwok, "High-throughput genotyping assay approaches," Pharmocogenomics, Feb. 2000, 1(1):95-100.
Lage et al., "Whole genome analysis of genetic alterations in small DNA samples using hyperbranched strand displacement amplification and array-CGH," Genome Research, 2003, 13(2):294-307.
Landegren et al., "Reading bits of genetic information: methods for single-nucleotide polymorphism analysis," Genome Res., Aug. 1998, 8(8):769-76.
Langdale et al., "A rapid method of gene detection using DNA bound to Sephacryl," Gene, 1985, 36(3):201-210.
Lee et al., "Fluorescent in situ sequencing (FISSEQ) of RNA for gene expression profiling in intact cells and tissues," Nature Protocols, 2015, 10(3):442-458.
Leriche et al., "Cleavable linkers in chemical biology," Bioorganic & Medicinal Chemistry, 2012, 20:571-582.
Linnarsson, "Recent advances in DNA sequencing methods—general principles of sample preparation," Experimental Cell Research, 2010, 316(8):1339-1343.
Liu et al., "High-Spatial-Resolution Multi-Omics Atlas Sequencing of Mouse Embryos via Deterministic Barcoding in Tissue," BioRxiv, 2019, 55 pages.
Lizardi et al., "Mutation detection and single-molecule counting using isothermal rolling-circle amplification," Nat. Genet., 1998, 19(3):225-232.
Lundberg et al., "Multiplexed homogeneous proximity ligation assays for high-throughput protein biomarker research in serological material," Mol Cell Proteomics, 2011, 10(4):M110.004978, 11 pages.
MacBeath et al., "Printing proteins as microarrays for high-throughput function determination," Science, Sep. 2000, 289(5485):1760-1763.
Maniatis et al., "Spatiotemporal Dynamics of Molecular Pathology in Amyotrophic Lateral Sclerosis", 54 pages, 2018.
Merritt et al., "Multiplex digital spatial profiling of proteins and RNA in fixed tissue," Nat Biotechnol, May 2020, 38(5):586-599.
Metzker, "Sequencing technologies—the next generation," Nature Reviews Genetics, 2010, 11(1):31-46.
Miller et al., "Basic concepts of microarrays and potential applications in clinical microbiology," Clinical Microbiology Reviews, 2009, 22(4):611-633.
Miller et al., "Chapter 11—Solid and Suspension Microarrays for Microbial Diagnostics," Methods in Microbiology, 2015, 42:395-431.
Mishra et al., "Three-dimensional genome architecture and emerging technologies: looping in disease," Genome Medicine, 2017, 9(1):87, 14 pages.
Mitra et al., "Digital genotyping and haplotyping with polymerase colonies," Proc. Natl. Acad. Sci. USA, May 2003, 100(10):5926-5931.
Mizusawa et al., "A bacteriophage lambda vector for cloning with BamHI and Sau3A," Gene, 1982, 20(3):317-322.
Moncada et al., "Building a tumor atlas: integrating single-cell RNA-Seq data with spatial transcriptomics in pancreatic ductal adenocarcinoma", Institute for Computational Medicine, bioRxiv, 28 pages, 2018.
Ncbi.nlm.nih.gov, [online], "Molecular Inversion Probe Assay," available on or before Oct. 14, 2014, via Internet Archive: Wayback Machine URL<https://web.archive.org/web/20141014124037/https://www.ncbi.nlm.nih.gov/probe/docs/techmip/>, retrieved on Jun. 16, 2021, retrieved from URL<https://www.ncbi.nlm.nih.gov/probe/docs/techmip/>, 2 pages.
Nikiforov et al., "The use of 96-well polystyrene plates for DNA hybridization-based assays: an evaluation of different approaches to oligonucleotide immobilization," Anal Biochem, May 1995, 227(1):201-9.
Nowak et al., "Entering the Postgenome Era," Science, 1995, 270(5235):368-71.
PCT International Preliminary Report on Patentability in International Appln. No. PCT/EP2016/057355, dated Oct. 10, 2017, 7 pages.
PCT International Preliminary Report on Patentability in International Appln. No. PCT/US2019/048425, dated Mar. 2, 2021, 9 pages.
PCT International Preliminary Report on Patentability in International Appln. No. PCT/US2021/018795, dated Sep. 1, 2022, 10 pages.
PCT International Preliminary Report on Patentability in International Appln. No. PCT/US2021/018816, dated Sep. 1, 2022, 9 pages.
PCT International Search Report and Written Opinion in International Appln. No. PCT/US2022/028071, dated Aug. 25, 2022, 13 pages.
Pemov et al., "DNA analysis with multiplex microarray-enhanced PCR," Nucl. Acids Res., Jan. 2005, 33(2):e11, 9 pages.
Perler et al., "Intervening sequences in an Archaea DNA polymerase gen," Proc Natl Acad Sci USA, Jun. 1992, 89(12):5577-5581.
Petterson et al., "Generations of sequencing technologies," Genomics, 2009, 93(2):105-111.
Polsky-Cynkin et al., "Use of DNA immobilized on plastic and agarose supports to detect DNA by sandwich hybridization," Clin. Chem., 1985, 31(9):1438-1443.
Ranki et al., "Sandwich hybridization as a convenient method for the detection of nucleic acids in crude samples," Gene, 1983, 21(1-2):77-85.
Reinartz et al., "Massively parallel signature sequencing (MPSS) as a tool for in-depth quantitative gene expression profiling in all organisms," Brief Funct Genomic Proteomic, Feb. 2002, 1(1):95-104.
Rodriques et al., "Slide-seq: A scalable technology for measuring genome-wide expression at high spatial resolution," Science, 2019, 363(6434):1463-1467.
Ronaghi et al., "A sequencing method based on real-time pyrophosphate," Science, Jul. 1998, 281(5375):363-365.
Ronaghi et al., "Real-time DNA sequencing using detection of pyrophosphate release," Analytical Biochemistry, Nov. 1996, 242(1):84-89.
Ronaghi, "Pyrosequencing sheds light on DNA sequencing," Genome Res, Jan. 2001, 11(1):3-11.
Salmén et al., "Barcoded solid-phase RNA capture for Spatial Transcriptomics profiling in mammalian tissue sections," Nature Protocols, Oct. 2018, 13(11):2501-2534.
Saxonov et al., "10x Genomics, Mastering Biology to Advance Human Health," PowerPoint, 10x, 2020, 41 pages.
Schena et al., "Quantitative monitoring of gene expression patterns with a complementary DNA microarray," Science, Oct. 1995, 270(5235):467-470.
Shalon et al., "A DNA microarray system for analyzing complex DNA samples using two-color fluorescent probe hybridization," Genome Res., Jul. 1996, 6(7):639-45.
Stahl et al., "Visualization and analysis of gene expression in tissue sections by spatial transcriptomics," Science, Jul. 2016, 353(6294):78-82.
Stahl et al., "Visualization and analysis of gene expression in tissue sections by spatial transcriptomics," Supplementary Materials, Science, Jul. 2016, 353(6294):78-82, 41 pages.
Stimpson et al., "Real-time detection of DNA hybridization and melting on oligonucleotide arrays by using optical wave guides," Proc Natl Acad Sci USA, Jul. 1995, 92(14):6379-83.

(56) References Cited

OTHER PUBLICATIONS

Strell et al., "Placing RNA in context and space—methods for spatially resolved transcriptomics," The FEBS Journal, 2019, 286(8):1468-1481.

Tijssen et al., "Overview of principles of hybridization and the strategy of nucleic acid assays" in Techniques in Biochemistry and Molecular Biology—Hybridization with Nucleic Acid Probes, 1993, 24(Chapter 2), 65 pages.

Trejo et al., "Extraction-free whole transcriptome gene expression analysis of FFPE sections and histology-directed subareas of tissue," PLoS ONE, Feb. 2019, 14(2):e0212031, 22 pages.

Twyman et al., "Techniques Patents for SNP Genotyping," Pharmacogenomics, Jan. 2003, 4(1):67-79.

Van Gelder et al., "Amplified RNA synthesized from limited quantities of heterogeneous cDNA," Proc. Natl. Acad. Sci. USA, 1990, 87(5):1663-1667.

Vasiliskov et al., "Fabrication of microarray of gel-immobilized compounds on a chip by copolymerization," Biotechniques, Sep. 1999, 27(3):592-606.

Vickovic et al., "High-definition spatial transcriptomics for in situ tissue profiling," Nat Methods, Oct. 2019, 16(10):987-990.

Vickovic et al., "SM-Omics: An automated Platform for High-Throughput Spatial Multi-Omics," bioRxiv, Oct. 2020, 40 pages.

Vogelstein et al., "Digital PCR," Proceedings of the National Academy of Sciences, Aug. 1999, 96(16):9236-9241.

Waichman et al., "Functional immobilization and patterning of proteins by an enzymatic transfer reaction," Analytical chemistry, 2010, 82(4):1478-85.

Walker et al., "Strand displacement amplification—an isothermal, in vitro DNA amplification technique," Nucleic Acids Research, 1992, 20(7):1691-1696.

Wang et al., "High-fidelity mRNA amplification for gene profiling," Nature Biotechnology, Apr. 2000, 18(4):457-459.

Wang et al., "Imaging-based pooled CRISPR screening reveals regulators of lncRNA localization," Proc Natl Acad Sci USA, May 2019, 116(22):10842-10851.

Wong et al., "Direct Site-Selective Covalent Protein Immobilization Catalyzed by a Phosphopantetheinyl Transferase," J. Am. Chem Soc., 2008, 130(37):12456-64.

Worthington et al., "Cloning of random oligonucleotides to create single-insert plasmid libraries," Anal Biochem, 2001, 294(2):169-175.

Yershov et al., "DNA analysis and diagnostics on oligonucleotide microchips," Proc. Natl. Acad. Sci. USA, May 1996, 93(10):4913-4918.

Yin et al., "Genetically encoded short peptide tag for versatile protein labeling by Sfp phosphopantetheinyl transferase," PNAS, 2005, 102(44):15815-20.

Zhou et al., "Genetically encoded short peptide tags for orthogonal protein labeling by Sfp and AcpS phosphopantetheinyl transferases," ACS Chemical Biol., 2007, 2(5):337-346.

Zhu et al., "Reverse transcriptase template switching: a smart approach for full-length cDNA library construction," Biotechniques, Apr. 2001, 30(4):892-897.

Asp et al., "A spatiotemporal organ-wide gene expression and cell atlas of the developing human heart," Cell, Dec. 12, 2019, 179(7):1647-1660.

Kuhn et al., "A novel, high-performance random array platform for quantitative gene expression profiling," Genome Res, 2004, 14:2347-2356.

Marx, "Method of the Year: spatially resolved transcriptomics," Nature Methods, 2021, 18(1):9-14.

Falconnet et al., "Rapid, Sensitive and Real-Time Multiplexing Platform for the Analysis of Protein and Nucleic-Acid Biomarkers," Anal. Chem., Jan. 7, 2015, 87:1582-1589.

Sun et al., "Statistical Analysis of Spatial Expression Pattern for Spatially Resolved Transcriptomic Studies," Nature Methods, Jan. 27, 2020, 17(2): 193-200.

Svensson et al., "SpatialDE: identification of spatially variable genes," Nature Methods, May 2018, 15:343-346, 15 pages.

U.S. Appl. No. 63/033,348, filed Jun. 2, 2020, Bent.

Borm et al., "High throughput human embryo spatial transcriptome mapping by surface transfer of tissue RNA," Abstracts Selected Talks, Single Cell Genomics mtg, (SCG2019), 2019, 1 pages (Abstract Only).

Chen et al., "Large field of view-spatially resolved transcriptomics at nanoscale resolution," bioRxiv, Jan. 19, 2021, retrieved from URL <https://www.biorxiv.org/node/1751045.abstract>, 37 pages.

Cho et al., "Seq-Scope: Submicrometer-resolution spatial transcriptomics for single cell and subcellular studies," bioRxiv, Jan. 27, 2021, retrieved from URL <https://www.biorxiv.org/node/1754517.abstract>, 50 pages.

Codeluppi et al., "Spatial organization of the somatosensory cortex revealed by osmFISH," Nature Methods, Nov. 2018, 15:932-935.

Eng et al., "Transcriptome-scale super-resolved imaging in tissues by RNA seqFISH+," Nature, Apr. 2019, 568(7751):235-239, 37 pages.

Goh et al., "Highly Specific Multiplexed RNA Imaging in Tissues With Split-FISH," Nat Methods, Jun. 15, 2020, 17(7):689-693, 21 pages.

Liu et al., "High-Spatial-Resolution Multi-Omics Sequencing via Deterministic Barcoding in Tissue," Cell, Nov. 13, 2020, 183(6):1665-1681, 36 pages.

Liu et al., "Spatial transcriptome sequencing of FFPE tissues at cellular level," bioRxiv 788992, Oct. 14, 2020, 39 pages.

Takei et al., "Integrated Spatial Genomics Reveals Global Architecture of Single Nuclei," Nature, Jan. 27, 2021, 590(7845):344-350, 53 pages.

Xia et al., "Spatial transcriptome profiling by MERFISH reveals subcellular RNA compartmentalization and cell cycle-dependent gene expression", Proceedings of the National Academy of Sciences, Sep. 2019, 116(39):19490-19499.

Stoeckius et al., "Simultaneous epitope and transcriptome measurement in single cells," Nature Methods, Jul. 31, 2017, 14(9):865-868.

Stickels et al., "Highly sensitive spatial transcriptomics at near-cellular resolution with Slide-seqV2," Nat Biotechnol., Mar. 2021, 39(3):313-319, 28 pages (Author Manuscript).

* cited by examiner

FLUORESCENT HYBRIDIZATION OF ANTIBODY-OLIGONUCLEOTIDE FOR MULTIPLEXING AND SIGNAL AMPLIFICATION

BACKGROUND

Cells within a tissue of a subject have differences in cell morphology and/or function due to varied analyte levels (e.g., gene and/or protein expression) within the different cells. The specific position of a cell within a tissue (e.g., the cell's position relative to neighboring cells or the cell's position relative to the tissue microenvironment) can affect, e.g., the cell's morphology, differentiation, fate, viability, proliferation, behavior, and signaling and cross-talk with other cells in the tissue.

Spatial heterogeneity has been previously studied using techniques that only provide data for a small handful of analytes in the context of an intact tissue or a portion of a tissue, or provide a lot of analyte data for single cells, but fail to provide information regarding the position of the single cell in a parent biological sample (e.g., tissue sample).

Immunostaining tissues and cells can be achieved by the use of fluorescently conjugated primary antibodies and/or the use of primary/secondary antibodies. However, the flexibility of visualizing the fluorescent probes is limited due to the available serotypes, the associated secondary antibodies, and the combinations that can be used. Due to these limitations, the capacity to amplify the fluorescent signal and multiplexing to visualize multiple probes are equally limited.

SUMMARY

Present immunostaining of biological samples is performed using two different methods: one that utilizes fluorescently-conjugated primary antibodies/or a combination of a primary and a secondary antibody. The flexibility of visualizing the labelled antibodies is limited due to the available serotypes, the associated second antibodies, and the limited number of possible combinations that can be used. Due to these limitations, the capacity to amplify the signal and multiplex to visualize multiple different target analytes are equally limited. The present invention provides an alternate method for detection of target analytes in a biological sample that overcomes these limitations of the present immunostaining methods.

Provided herein are methods of determining the location of target analytes in a biological sample, including: (a) delivering: (i) a first subset of analyte-binding moieties to the biological sample, wherein an analyte-binding moiety of the first subset of analyte-binding moieties binds a target analyte; and (ii) a first plurality of oligonucleotide-conjugated binding agents to the biological sample, wherein an oligonucleotide-conjugated binding agent of the first plurality of oligonucleotide-conjugated binding agents includes a second subset of analyte-binding moieties that bind to the first subset of analyte-binding moieties bound to the target analytes in the biological sample, wherein a second analyte-binding moiety of the second subset is conjugated to an oligonucleotide comprising two or more oligonucleotide sequences; and (iii) a second plurality of oligonucleotide conjugated binding agents to the biological sample, wherein an oligonucleotide conjugated binding agent of the second plurality of oligonucleotide conjugated agents includes a third subset of analyte binding moieties that bind to target analytes on the biological sample and wherein the analyte binding moieties are conjugated to an oligonucleotide including two or more oligonucleotide sequences, (b) contacting the biological sample with a plurality of detection probes, wherein at least two detection probes of the plurality of detection probes each includes: (i) a nucleic acid sequence that specifically binds to at least a portion of one of the two or more oligonucleotide sequences of the first and second oligonucleotide conjugated binding agents, and (ii) a detectable label; and (c) detecting the detectable labels of the at least two detection probes, thereby determining the locations of target analytes in the biological sample.

Also provided herein are methods of determining the location of target analytes in a biological sample, including: (a) delivering a plurality of oligonucleotide-conjugated binding agents to a biological sample, wherein an oligonucleotide-conjugated binding agent of the plurality of oligonucleotide-conjugated binding agents includes an analyte-binding moiety that binds to a target analyte in the biological sample, wherein the analyte-binding moiety is conjugated to an oligonucleotide including two or more oligonucleotide sequences; (b) simultaneously contacting the biological sample with a plurality of detection probes, wherein at least two detection probes of the plurality of detection probes each includes (i) a nucleic acid sequence that specifically binds to at least a portion of one of the two or more oligonucleotide sequences, and (ii) a detectable label; and (c) detecting the detectable labels of the at least two detection probes, thereby determining the locations of target analytes in the biological sample.

Also provided herein are methods of determining the presence of target analytes in a biological sample, including: (a) delivering a plurality of oligonucleotide-conjugated binding agents to a biological sample, wherein an oligonucleotide-conjugated binding agent of the plurality of oligonucleotide-conjugated binding agents includes an analyte-binding moiety that binds to the target analyte in the biological sample, wherein the analyte-binding moiety is conjugated to an oligonucleotide comprising two or more oligonucleotide sequences; (b) simultaneously contacting the biological sample with a plurality of detection probes, wherein at least two detection probes of the plurality of detection probes each includes (i) a nucleic acid sequence that specifically binds to at least a portion of one of the two or more oligonucleotide sequences, and (ii) a detectable label; and (c) detecting the detectable labels of the at least two detection probes, thereby determining the presence of the target analytes in the biological sample.

In some embodiments, the method further includes fixing the biological sample after the delivering in step (a). In some embodiments, the fixing includes paraformaldehyde, formalin, methanol, acetone, ethanol, formaldehyde, glutaraldehyde, or combinations thereof.

In some embodiments, the method further includes, washing the biological sample to remove oligonucleotide-conjugated binding agents that are not specifically bound to the target analytes or the analyte-binding moieties bound to the target analytes. In some embodiments, the method further includes, washing the biological sample to remove detection probes that are not specifically bound to the first plurality of oligonucleotide-conjugated binding agents or the second plurality of oligonucleotide-conjugated binding agents.

In some embodiments, each of the two or more oligonucleotide sequences of the first or the second oligonucleotide binding agent are the same sequence. In some embodiments, each of the two or more oligonucleotide sequences of the first or the second oligonucleotide binding agent are a different sequence. In some embodiments, each of the two or more oligonucleotide sequences of the first or the second oligonucleotide binding agent includes a total of 5 nucleotides to about 30 nucleotides. In some embodiments, each of the two or more oligonucleotide sequences of the first or the second oligonucleotide binding agent includes a total of about 10 nucleotides to about 20 nucleotides. In some embodiments, the oligonucleotide of the first or the second oligonucleotide binding agent includes a total of two to ten sequences. In some embodiments, the oligonucleotide of the first or the second oligonucleotide binding agent includes a total of two to five sequences.

In some embodiments, each of the at least two detection probes includes the same detectable label. In some embodiments, each of the at least two detection probes includes a different detectable label.

In some embodiments, the target analyte is selected from the group consisting of: RNA, DNA, a protein, a small molecule, and a metabolite. In some embodiments, the target analyte is a protein selected from the group consisting of a cell surface protein, an extracellular protein, and an intracellular protein.

In some embodiments, the first, second, and third analyte-binding moiety includes an antibody or an antigen-binding domain thereof.

In some embodiments, the detectable labels include a fluorophore. In some embodiments, the detecting is performed using imaging. In some embodiments, the detecting is performed using epifluorescence microscopy or confocal microscopy or multiphoton microscopy.

In some embodiments, the biological sample is a tissue sample. In some embodiments, the tissue sample is a fixed tissue sample. In some embodiments, the fixed tissue sample is a formalin fixed paraffin embedded tissue sample. In some embodiments, the tissue sample is a fresh frozen tissue sample.

In some embodiments, the delivering in step (a) further includes delivering a plurality of analyte binding moieties that bind to target analytes in the biological sample and a second plurality of oligonucleotide-conjugated binding agents that bind to the analyte binding moieties bound to target analytes in the biological sample, wherein a second oligonucleotide-conjugated binding agent of the second plurality of oligonucleotide-conjugated binding agents includes a second analyte-binding moiety that binds to the analyte-binding moiety bound to the target analyte, wherein the second analyte-binding moiety is conjugated to a second oligonucleotide including two or more oligonucleotide sequences.

In some embodiments, each of the two or more oligonucleotide sequences are the same sequence. In some embodiments, each of the two or more oligonucleotide sequences are a different sequence. In some embodiments, each of the two or more oligonucleotide sequences includes a total of 5 nucleotides to about 30 nucleotides. In some embodiments, each of the two or more oligonucleotide sequences includes a total of about 10 nucleotides to about 20 nucleotides. In some embodiments, the second oligonucleotide includes a total of two to ten sequences. In some embodiments, the second oligonucleotide includes a total of two to five sequences.

In some embodiments, each of the at least two detection probes includes the same detectable label. In some embodiments, each of the at least two detection probes includes a different detectable label.

All publications, patents, patent applications, and information available on the internet and mentioned in this specification are herein incorporated by reference to the same extent as if each individual publication, patent, patent application, or item of information was specifically and individually indicated to be incorporated by reference. To the extent publications, patents, patent applications, and items of information incorporated by reference contradict the disclosure contained in the specification, the specification is intended to supersede and/or take precedence over any such contradictory material.

Where values are described in terms of ranges, it should be understood that the description includes the disclosure of all possible sub-ranges within such ranges, as well as specific numerical values that fall within such ranges irrespective of whether a specific numerical value or specific sub-range is expressly stated.

The term "each," when used in reference to a collection of items, is intended to identify an individual item in the collection but does not necessarily refer to every item in the collection, unless expressly stated otherwise, or unless the context of the usage clearly indicates otherwise.

Various embodiments of the features of this disclosure are described herein. However, it should be understood that such embodiments are provided merely by way of example, and numerous variations, changes, and substitutions can occur to those skilled in the art without departing from the scope of this disclosure. It should also be understood that various alternatives to the specific embodiments described herein are also within the scope of this disclosure.

DESCRIPTION OF DRAWINGS

The following drawings illustrate certain embodiments of the features and advantages of this disclosure. These embodiments are not intended to limit the scope of the appended claims in any manner. Like reference symbols in the drawings indicate like elements.

DETAILED DESCRIPTION

I. Introduction

Figure 1:
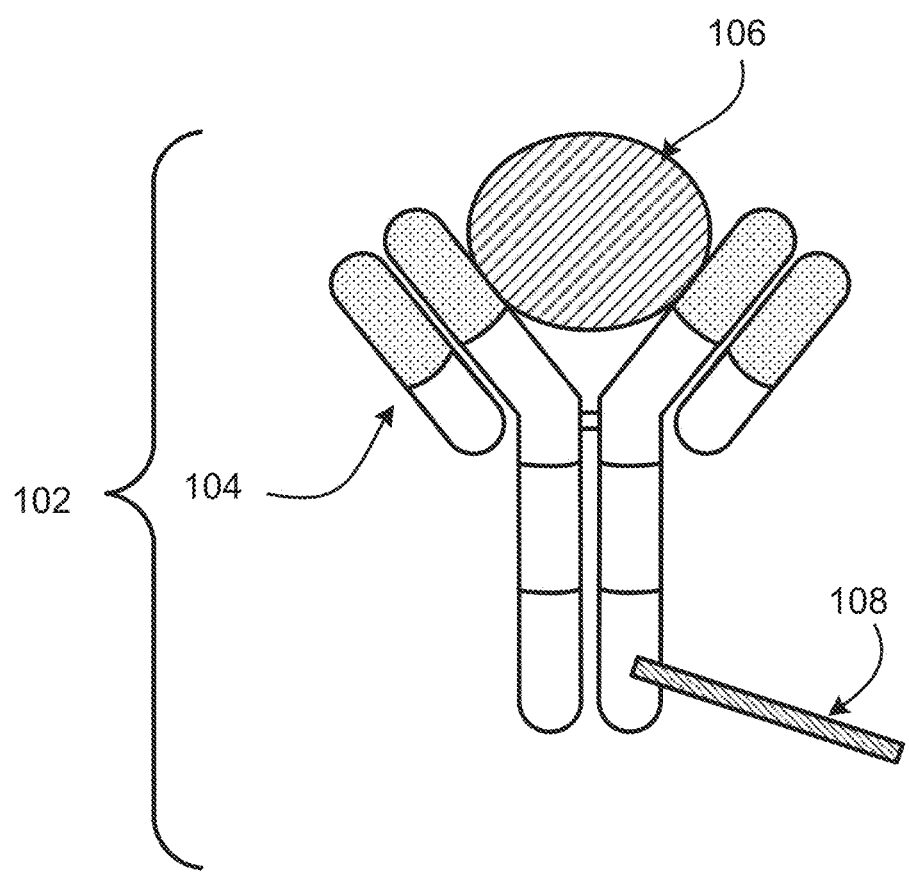
FIG. 1 is a schematic diagram of an exemplary oligonucleotide-conjugated binding agent.

Disclosed herein are methods of determining the location or presence of target analytes in a biological sample. The methods provided herein utilize binding agents (e.g., antibodies) conjugated to an oligonucleotide sequence thereby creating oligonucleotide-conjugated binding agents. The oligonucleotide sequences conjugated to different binding agents can differ in order, length, and/or complexity. Following contact with the binding agents, the biological sample can be fixed to crosslink the binding agents and stabilize the interaction between the binding agent and the target analyte in a biological sample. The biological sample can be contacted with a probe comprising (i) an oligonucleotide complementary to a sequence present in the oligonucleotide conjugated to the binding agent and (ii) a detectable agent (e.g., a fluorophore). Due to the specificity of the hybridization, this strategy allows for the simultaneous detection of one or a multitude of target analytes in a biological sample. Different detectable agents (e.g., fluorophores) can be chosen that exhibit different spectral emission properties, which can be multiplexed and detected. The detection can be performed using, for example, fluorescence microscopy, spectral detector imaging, confocal microscopy or multiphoton microscopy.

Spatial analysis methodologies and compositions described herein can provide a vast amount of analyte and/or expression data for a variety of analytes within a biological sample at high spatial resolution, while retaining native spatial context. Spatial analysis methods and compositions can include, e.g., the use of a capture probe including a spatial barcode (e.g., a nucleic acid sequence that provides information as to the location or position of an analyte within a cell or a tissue sample (e.g., mammalian cell or a mammalian tissue sample) and a capture domain that is capable of binding to an analyte (e.g., a protein and/or a nucleic acid) produced by and/or present in a cell. Spatial analysis methods and compositions can also include the use of a capture probe having a capture domain that captures an intermediate agent for indirect detection of an analyte. For example, the intermediate agent can include a nucleic acid sequence (e.g., a barcode) associated with the intermediate agent. Detection of the intermediate agent is therefore indicative of the analyte in the cell or tissue sample.

Non-limiting aspects of spatial analysis methodologies and compositions are described in U.S. Pat. Nos. 10,774,374, 10,724,078, 10,480,022, 10,059,990, 10,041,949, 10,002,316, 9,879,313, 9,783,841, 9,727,810, 9,593,365, 8,951,726, 8,604,182, 7,709,198, U.S. Patent Application Publication Nos. 2020/239946, 2020/080136, 2020/0277663, 2020/024641, 2019/330617, 2019/264268, 2020/256867, 2020/224244, 2019/194709, 2019/161796, 2019/085383, 2019/055594, 2018/216161, 2018/051322, 2018/0245142, 2017/241911, 2017/089811, 2017/067096, 2017/029875, 2017/0016053, 2016/108458, 2015/000854, 2013/171621, WO 2018/091676, WO 2020/176788, Rodriques et al., Science 363(6434):1463-1467, 2019; Lee et al., Nat. Protoc. 10(3):442-458, 2015; Trejo et al., PLOS ONE 14(2): e0212031, 2019; Chen et al., Science 348(6233):aaa6090, 2015; Gao et al., BMC Biol. 15:50, 2017; and Gupta et al., Nature Biotechnol. 36:1197-1202, 2018; the Visium Spatial Gene Expression Reagent Kits User Guide (e.g., Rev C, dated June 2020), and/or the Visium Spatial Tissue Optimization Reagent Kits User Guide (e.g., Rev C, dated July 2020), both of which are available at the 10× Genomics Support Documentation website, and can be used herein in any combination. Further non-limiting aspects of spatial analysis methodologies and compositions are described herein.

Some general terminology that may be used in this disclosure can be found in Section (I)(b) of WO 2020/176788 and/or U.S. Patent Application Publication No. 2020/0277663. Typically, a "barcode" is a label, or identifier, that conveys or is capable of conveying information (e.g., information about an analyte in a sample, a bead, and/or a capture probe). A barcode can be part of an analyte, or independent of an analyte. A barcode can be attached to an analyte. A particular barcode can be unique relative to other barcodes. For the purpose of this disclosure, an "analyte" can include any biological substance, structure, moiety, or component to be analyzed. The term "target" can similarly refer to an analyte of interest.

Analytes can be broadly classified into one of two groups: nucleic acid analytes, and non-nucleic acid analytes. Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral proteins (e.g., viral capsid, viral envelope, viral coat, viral accessory, viral glycoproteins, viral spike, etc.), extracellular and intracellular proteins, antibodies, and antigen binding fragments. In some embodiments, the analyte(s) can be localized to subcellular location(s), including, for example, organelles, e.g., mitochondria, Golgi apparatus, endoplasmic reticulum, chloroplasts, endocytic vesicles, exocytic vesicles, vacuoles, lysosomes, etc. In some embodiments, analyte(s) can be peptides or proteins, including without limitation antibodies and enzymes. Additional examples of analytes can be found in Section (I)(c) of WO 2020/176788 and/or U.S. Patent Application Publication No. 2020/0277663. In some embodiments, an analyte can be detected indirectly, such as through detection of an intermediate agent, for example, a ligation product or an analyte capture agent (e.g., an oligonucleotide-conjugated antibody), such as those described herein.

A "biological sample" is typically obtained from the subject for analysis using any of a variety of techniques including, but not limited to, biopsy, surgery, and laser capture microscopy (LCM), and generally includes cells and/or other biological material from the subject. In some embodiments, a biological sample can be a tissue section. In some embodiments, a biological sample can be a fixed and/or stained biological sample (e.g., a fixed and/or stained tissue section). Non-limiting examples of stains include histological stains (e.g., hematoxylin and/or eosin) and immunological stains (e.g., fluorescent stains). In some embodiments, a biological sample (e.g., a fixed and/or stained biological sample) can be imaged. Biological samples are also described in Section (I)(d) of WO 2020/176788 and/or U.S. Patent Application Publication No. 2020/0277663.

In some embodiments, a biological sample is permeabilized with one or more permeabilization reagents. For example, permeabilization of a biological sample can facilitate analyte capture. Exemplary permeabilization agents and conditions are described in Section (I)(d)(ii)(13) or the Exemplary Embodiments Section of WO 2020/176788 and/or U.S. Patent Application Publication No. 2020/0277663.

Array-based spatial analysis methods involve the transfer of one or more analytes from a biological sample to an array of features on a substrate, where each feature is associated with a unique spatial location on the array. Subsequent analysis of the transferred analytes includes determining the identity of the analytes and the spatial location of the analytes within the biological sample. The spatial location of an analyte within the biological sample is determined based on the feature to which the analyte is bound (e.g., directly or indirectly) on the array, and the feature's relative spatial location within the array.

A "capture probe" refers to any molecule capable of capturing (directly or indirectly) and/or labelling an analyte (e.g., an analyte of interest) in a biological sample. In some embodiments, the capture probe is a nucleic acid or a polypeptide. In some embodiments, the capture probe includes a barcode (e.g., a spatial barcode and/or a unique molecular identifier (UMI)) and a capture domain). In some embodiments, a capture probe can include a cleavage domain and/or a functional domain (e.g., a primer-binding site, such as for next-generation sequencing (NGS)). See, e.g., Section (II)(b) (e.g., subsections (i)-(vi)) of WO 2020/176788 and/or U.S. Patent Application Publication No. 2020/0277663. Generation of capture probes can be achieved by any appropriate method, including those described in Section (II)(d)(ii) of WO 2020/176788 and/or U.S. Patent Application Publication No. 2020/0277663.

In some embodiments, more than one analyte type (e.g., nucleic acids and proteins) from a biological sample can be detected (e.g., simultaneously or sequentially) using any appropriate multiplexing technique, such as those described in Section (IV) of WO 2020/176788 and/or U.S. Patent Application Publication No. 2020/0277663.

In some embodiments, detection of one or more analytes (e.g., protein analytes) can be performed using one or more analyte capture agents. As used herein, an "analyte capture agent" refers to an agent that interacts with an analyte (e.g., an analyte in a biological sample) and with a capture probe (e.g., a capture probe attached to a substrate or a feature) to identify the analyte. In some embodiments, the analyte capture agent includes: (i) an analyte binding moiety (e.g., that binds to an analyte), for example, an antibody or antigen-binding fragment thereof; (ii) analyte binding moiety barcode; and (iii) an analyte capture sequence. As used herein, the term "analyte binding moiety barcode" refers to a barcode that is associated with or otherwise identifies the analyte binding moiety. As used herein, the term "analyte capture sequence" refers to a region or moiety configured to hybridize to, bind to, couple to, or otherwise interact with a capture domain of a capture probe. In some cases, an analyte binding moiety barcode (or portion thereof) may be able to be removed (e.g., cleaved) from the analyte capture agent. Additional description of analyte capture agents can be found in Section (II)(b)(ix) of WO 2020/176788 and/or Section (II)(b)(viii) U.S. Patent Application Publication No. 2020/0277663.

There are at least two methods to associate a spatial barcode with one or more neighboring cells, such that the spatial barcode identifies the one or more cells, and/or contents of the one or more cells, as associated with a particular spatial location. One method is to promote analytes or analyte proxies (e.g., intermediate agents) out of a cell and towards a spatially-barcoded array (e.g., including spatially-barcoded capture probes). Another method is to cleave spatially-barcoded capture probes from an array and promote the spatially-barcoded capture probes towards and/or into or onto the biological sample.

In some cases, capture probes may be configured to prime, replicate, and consequently yield optionally barcoded extension products from a template (e.g., a DNA or RNA template, such as an analyte or an intermediate agent (e.g., a ligation product or an analyte capture agent), or a portion thereof), or derivatives thereof (see, e.g., Section (II)(b)(vii) of WO 2020/176788 and/or U.S. Patent Application Publication No. 2020/0277663 regarding extended capture probes). In some cases, capture probes may be configured to form ligation products with a template (e.g., a DNA or RNA template, such as an analyte or an intermediate agent, or portion thereof), thereby creating ligations products that serve as proxies for a template.

As used herein, an "extended capture probe" refers to a capture probe having additional nucleotides added to the terminus (e.g., 3' or 5' end) of the capture probe thereby extending the overall length of the capture probe. For example, an "extended 3' end" indicates additional nucleotides were added to the most 3' nucleotide of the capture probe to extend the length of the capture probe, for example, by polymerization reactions used to extend nucleic acid molecules including templated polymerization catalyzed by a polymerase (e.g., a DNA polymerase or a reverse transcriptase). In some embodiments, extending the capture probe includes adding to a 3' end of a capture probe a nucleic acid sequence that is complementary to a nucleic acid sequence of an analyte or intermediate agent specifically bound to the capture domain of the capture probe. In some embodiments, the capture probe is extended using reverse transcription. In some embodiments, the capture probe is extended using one or more DNA polymerases. The extended capture probes include the sequence of the capture probe and the sequence of the spatial barcode of the capture probe.

In some embodiments, extended capture probes are amplified (e.g., in bulk solution or on the array) to yield quantities that are sufficient for downstream analysis, e.g., via DNA sequencing. In some embodiments, extended capture probes (e.g., DNA molecules) act as templates for an amplification reaction (e.g., a polymerase chain reaction).

Additional variants of spatial analysis methods, including in some embodiments, an imaging step, are described in Section (II)(a) of WO 2020/176788 and/or U.S. Patent Application Publication No. 2020/0277663. Analysis of captured analytes (and/or intermediate agents or portions thereof), for example, including sample removal, extension of capture probes, sequencing (e.g., of a cleaved extended capture probe and/or a cDNA molecule complementary to an extended capture probe), sequencing on the array (e.g., using, for example, in situ hybridization or in situ ligation approaches), temporal analysis, and/or proximity capture, is described in Section (II)(g) of WO 2020/176788 and/or U.S. Patent Application Publication No. 2020/0277663. Some quality control measures are described in Section (II)(h) of WO 2020/176788 and/or U.S. Patent Application Publication No. 2020/0277663.

Spatial information can provide information of biological and/or medical importance. For example, the methods and compositions described herein can allow for: identification of one or more biomarkers (e.g., diagnostic, prognostic, and/or for determination of efficacy of a treatment) of a disease or disorder; identification of a candidate drug target for treatment of a disease or disorder; identification (e.g., diagnosis) of a subject as having a disease or disorder; identification of stage and/or prognosis of a disease or disorder in a subject; identification of a subject as having an increased likelihood of developing a disease or disorder; monitoring of progression of a disease or disorder in a subject; determination of efficacy of a treatment of a disease or disorder in a subject; identification of a patient subpopulation for which a treatment is effective for a disease or disorder; modification of a treatment of a subject with a disease or disorder; selection of a subject for participation in a clinical trial; and/or selection of a treatment for a subject with a disease or disorder.

Spatial information can provide information of biological importance. For example, the methods and compositions described herein can allow for: identification of transcriptome and/or proteome expression profiles (e.g., in healthy and/or diseased tissue); identification of multiple analyte types in close proximity (e.g., nearest neighbor analysis); determination of up- and/or down-regulated genes and/or proteins in diseased tissue; characterization of tumor microenvironments; characterization of tumor immune responses; characterization of cells types and their co-localization in tissue; and identification of genetic variants within tissues (e.g., based on gene and/or protein expression profiles associated with specific disease or disorder biomarkers).

Typically, for spatial array-based methods, a substrate functions as a support for direct or indirect attachment of capture probes to features of the array. A "feature" is an entity that acts as a support or repository for various molecular entities used in spatial analysis. In some embodiments, some or all of the features in an array are functionalized for analyte capture. Exemplary substrates are described in Section (II)(c) of WO 2020/176788 and/or U.S. Patent Application Publication No. 2020/0277663. Exemplary features and geometric attributes of an array can be found in Sections (II)(d)(i), (II)(d)(iii), and (II)(d)(iv) of WO 2020/176788 and/or U.S. Patent Application Publication No. 2020/0277663.

Generally, analytes and/or intermediate agents (or portions thereof) can be captured when contacting a biological sample with a substrate including capture probes (e.g., a substrate with capture probes embedded, spotted, printed, fabricated on the substrate, or a substrate with features (e.g., beads, wells) comprising capture probes). As used herein, "contact," "contacted," and/or "contacting," a biological sample with a substrate refers to any contact (e.g., direct or indirect) such that capture probes can interact (e.g., bind covalently or non-covalently (e.g., hybridize)) with analytes from the biological sample. Capture can be achieved actively (e.g., using electrophoresis) or passively (e.g., using diffusion). Analyte capture is further described in Section (II)(e) of WO 2020/176788 and/or U.S. Patent Application Publication No. 2020/0277663.

In some cases, spatial analysis can be performed by attaching and/or introducing a molecule (e.g., a peptide, a lipid, or a nucleic acid molecule) having a barcode (e.g., a spatial barcode) to a biological sample (e.g., to a cell in a biological sample). In some embodiments, a plurality of molecules (e.g., a plurality of nucleic acid molecules) having a plurality of barcodes (e.g., a plurality of spatial barcodes) are introduced to a biological sample (e.g., to a plurality of cells in a biological sample) for use in spatial analysis. In some embodiments, after attaching and/or introducing a molecule having a barcode to a biological sample, the biological sample can be physically separated (e.g., dissociated) into single cells or cell groups for analysis. Some such methods of spatial analysis are described in Section (III) of WO 2020/176788 and/or U.S. Patent Application Publication No. 2020/0277663.

In some cases, spatial analysis can be performed by detecting multiple oligonucleotides that hybridize to an analyte. In some instances, for example, spatial analysis can be performed using RNA-templated ligation (RTL). Methods of RTL have been described previously. See, e.g., Credle et al., *Nucleic Acids Res.* 2017 Aug. 21;45 (14):e128. Typically, RTL includes hybridization of two oligonucleotides to adjacent sequences on an analyte (e.g., an RNA molecule, such as an mRNA molecule). In some instances, the oligonucleotides are DNA molecules. In some instances, one of the oligonucleotides includes at least two ribonucleic acid bases at the 3' end and/or the other oligonucleotide includes a phosphorylated nucleotide at the 5' end. In some instances, one of the two oligonucleotides includes a capture domain (e.g., a poly(A) sequence, a non-homopolymeric sequence). After hybridization to the analyte, a ligase (e.g., SplintR ligase) ligates the two oligonucleotides together, creating a ligation product. In some instances, the two oligonucleotides hybridize to sequences that are not adjacent to one another. For example, hybridization of the two oligonucleotides creates a gap between the hybridized oligonucleotides. In some instances, a polymerase (e.g., a DNA polymerase) can extend one of the oligonucleotides prior to ligation. After ligation, the ligation product is released from the analyte. In some instances, the ligation product is released using an endonuclease (e.g., RNAse H). The released ligation product can then be captured by capture probes (e.g., instead of direct capture of an analyte) on an array, optionally amplified, and sequenced, thus determining the location and optionally the abundance of the analyte in the biological sample.

During analysis of spatial information, sequence information for a spatial barcode associated with an analyte is obtained, and the sequence information can be used to provide information about the spatial distribution of the analyte in the biological sample. Various methods can be used to obtain the spatial information. In some embodiments, specific capture probes and the analytes they capture are associated with specific locations in an array of features on a substrate. For example, specific spatial barcodes can be associated with specific array locations prior to array fabrication, and the sequences of the spatial barcodes can be stored (e.g., in a database) along with specific array location information, so that each spatial barcode uniquely maps to a particular array location.

Alternatively, specific spatial barcodes can be deposited at predetermined locations in an array of features during fabrication such that at each location, only one type of spatial barcode is present so that spatial barcodes are uniquely associated with a single feature of the array. Where necessary, the arrays can be decoded using any of the methods described herein so that spatial barcodes are uniquely associated with array feature locations, and this mapping can be stored as described above.

When sequence information is obtained for capture probes and/or analytes during analysis of spatial information, the locations of the capture probes and/or analytes can be determined by referring to the stored information that uniquely associates each spatial barcode with an array feature location. In this manner, specific capture probes and captured analytes are associated with specific locations in the array of features. Each array feature location represents a position relative to a coordinate reference point (e.g., an array location, a fiducial marker) for the array. Accordingly, each feature location has an "address" or location in the coordinate space of the array.

Some exemplary spatial analysis workflows are described in the Exemplary Embodiments section of WO 2020/176788 and/or U.S. Patent Application Publication No. 2020/0277663. See, for example, the Exemplary embodiment starting with "In some non-limiting examples of the workflows described herein, the sample can be immersed . . . " of WO 2020/176788 and/or U.S. Patent Application Publication No. 2020/0277663. See also, e.g., the Visium Spatial Gene Expression Reagent Kits User Guide (e.g., Rev C, dated June 2020), and/or the Visium Spatial Tissue Optimization Reagent Kits User Guide (e.g., Rev C, dated July 2020).

In some embodiments, spatial analysis can be performed using dedicated hardware and/or software, such as any of the systems described in Sections (II)(e)(ii) and/or (V) of WO 2020/176788 and/or U.S. Patent Application Publication No. 2020/0277663, or any of one or more of the devices or methods described in Sections *Control Slide for Imaging, Methods of Using Control Slides and Substrates for, Systems of Using Control Slides and Substrates for Imaging, and/or Sample and Array Alignment Devices and Methods, Informational labels* of WO 2020/123320.

Suitable systems for performing spatial analysis can include components such as a chamber (e.g., a flow cell or sealable, fluid-tight chamber) for containing a biological sample. The biological sample can be mounted for example, in a biological sample holder. One or more fluid chambers can be connected to the chamber and/or the sample holder via fluid conduits, and fluids can be delivered into the chamber and/or sample holder via fluidic pumps, vacuum sources, or other devices coupled to the fluid conduits that create a pressure gradient to drive fluid flow. One or more valves can also be connected to fluid conduits to regulate the flow of reagents from reservoirs to the chamber and/or sample holder.

The systems can optionally include a control unit that includes one or more electronic processors, an input interface, an output interface (such as a display), and a storage unit (e.g., a solid state storage medium such as, but not limited to, a magnetic, optical, or other solid state, persistent, writeable and/or re-writeable storage medium). The control unit can optionally be connected to one or more remote devices via a network. The control unit (and components thereof) can generally perform any of the steps and functions described herein. Where the system is connected to a remote device, the remote device (or devices) can perform any of the steps or features described herein. The systems can optionally include one or more detectors (e.g., CCD, CMOS) used to capture images. The systems can also optionally include one or more light sources (e.g., LED-based, diode-based, lasers) for illuminating a sample, a substrate with features, analytes from a biological sample captured on a substrate, and various control and calibration media.

The systems can optionally include software instructions encoded and/or implemented in one or more of tangible storage media and hardware components such as application specific integrated circuits. The software instructions, when executed by a control unit (and in particular, an electronic processor) or an integrated circuit, can cause the control unit, integrated circuit, or other component executing the software instructions to perform any of the method steps or functions described herein.

In some cases, the systems described herein can detect (e.g., register an image) the biological sample on the array. Exemplary methods to detect the biological sample on an array are described in PCT Application No. 2020/061064 and/or U.S. patent application Ser. No. 16/951,854.

Prior to transferring analytes from the biological sample to the array of features on the substrate, the biological sample can be aligned with the array. Alignment of a biological sample and an array of features including capture probes can facilitate spatial analysis, which can be used to detect differences in analyte presence and/or level within different positions in the biological sample, for example, to generate a three-dimensional map of the analyte presence and/or level. Exemplary methods to generate a two- and/or three-dimensional map of the analyte presence and/or level are described in PCT Application No. 2020/053655 and spatial analysis methods are generally described in WO 2020/061108 and/or U.S. patent application Ser. No. 16/951,864.

In some cases, a map of analyte presence and/or level can be aligned to an image of a biological sample using one or more fiducial markers, e.g., objects placed in the field of view of an imaging system which appear in the image produced, as described in the *Substrate Attributes* Section, *Control Slide for Imaging* Section of WO 2020/123320, PCT Application No. 2020/061066, and/or U.S. patent application Ser. No. 16/951,843. Fiducial markers can be used as a point of reference or measurement scale for alignment (e.g., to align a sample and an array, to align two substrates, to determine a location of a sample or array on a substrate relative to a fiducial marker) and/or for quantitative measurements of sizes and/or distances.

II. Fluorescent Detection of Oligonucleotide-Conjugated Binding Agents (a) Background Immunostaining of biological samples can be performed, for example, by utilizing fluorescently-conjugated primary antibodies/or a combination of a primary and a secondary antibody. The flexibility of visualizing the labelled antibodies is limited due to the available serotypes, the associated second antibodies, and the limited number of possible combinations that can be used. Due to these limitations, the capacity to amplify a signal or multiplex different signals to visualize multiple different target analytes are equally limited. The present invention provides alternate methods for detection of target analytes in a biological sample that overcomes these limitations of present immunostaining methods.

Figure 2:
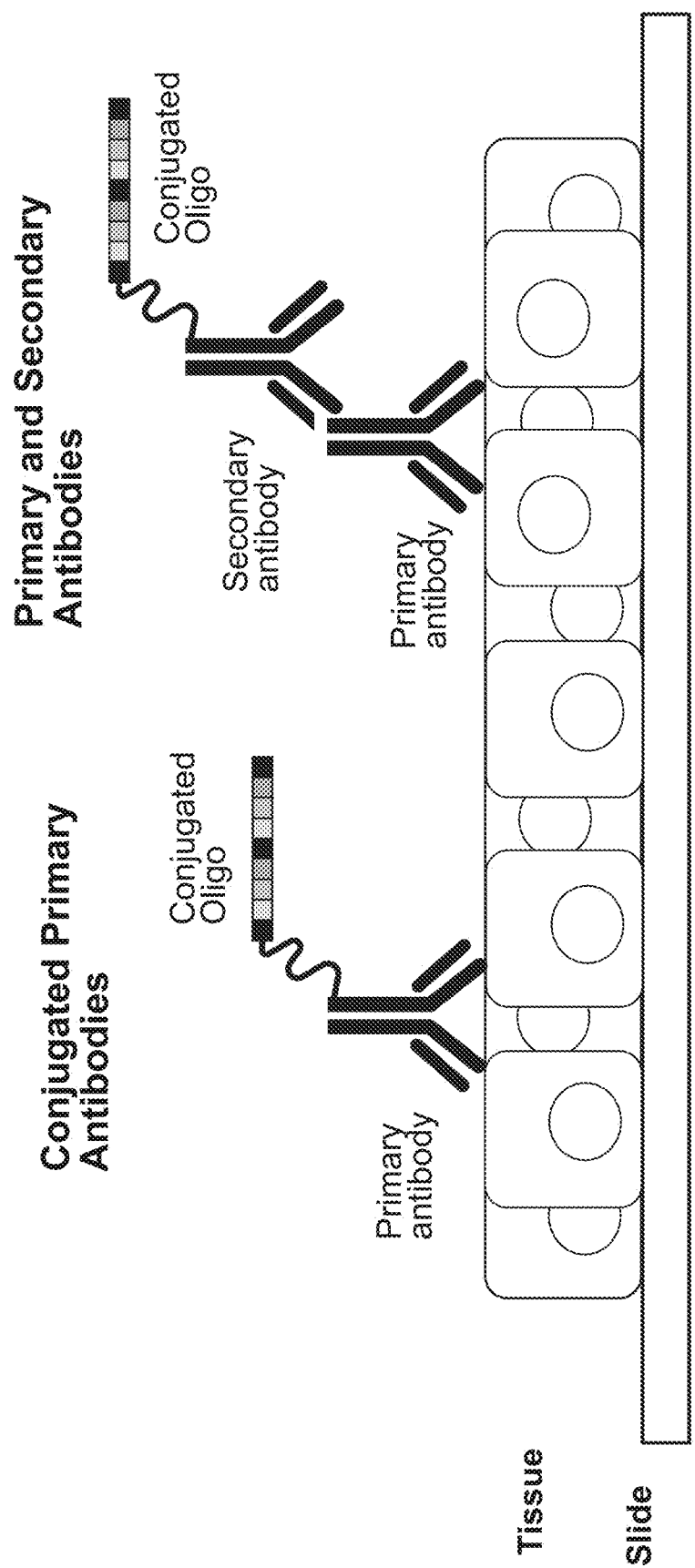
FIG. 2 is a schematic illustration of a method that includes (left) the use of a single oligonucleotide-conjugated binding agent that binds specifically to a target analyte in a biological sample or (right) the use of a primary antibody that binds specifically to a target analyte in a biological sample and an oligonucleotide-conjugated binding agent wherein the binding agent is a secondary antibody that binds specifically to the primary antibody.

The methods provided herein utilize binding agents (e.g., antibodies) conjugated to an oligonucleotide sequence thereby creating oligonucleotide-conjugated binding agents (FIG. 2). The oligonucleotide sequences conjugated to different binding agents can differ in order, length, and/or complexity. Following contact with the binding agents, the biological sample can be fixed to crosslink the binding agents and stabilize the interaction between the binding agent and the target analyte in a biological sample. The biological sample can be contacted with a detection probe comprising (i) an oligonucleotide complementary to a sequence present in the oligonucleotide conjugated to the binding agent and (ii) a detectable agent (e.g., a fluorophore). Due to the specificity of the hybridization, this strategy allows for the simultaneous detection of one or a multitude of target analytes in a biological sample. Different detectable labels (e.g., fluorophores) can be chosen that exhibit different spectral emission properties, which can be multiplexed and detected. The detection can be performed using, for example, fluorescence microscopy, spectral detector imaging, confocal microscopy or multiphoton microscopy.

Provided herein are methods of determining the location of target analytes (e.g., any of the exemplary analytes described herein) in a biological sample (e.g., any of the exemplary biological samples described herein) that include: (a) delivering: (i) a first subset of analyte-binding moieties to the biological sample, wherein an analyte-binding moiety of the first subset of analyte-binding moieties binds a target analyte; and (ii) a first plurality of oligonucleotide-conjugated binding agents to the biological sample, wherein an oligonucleotide-conjugated binding agent of the first plurality of oligonucleotide-conjugated binding agents comprises a second subset of analyte-binding moieties that bind to the first subset of analyte-binding moieties bound to the target analytes in the biological sample, wherein a second analyte-binding moiety of the second subset is conjugated to an oligonucleotide comprising two or more oligonucleotide sequences; and (iii) a second plurality of oligonucleotide conjugated binding agents to the biological sample, wherein an oligonucleotide conjugated binding agent of the second plurality of oligonucleotide conjugated agents comprises a third subset of analyte binding moieties that bind to target analytes on the biological sample and wherein the analyte binding moieties are conjugated to an oligonucleotide comprising two or more oligonucleotide sequences, (b) contacting the biological sample with a plurality of detection probes, wherein at least two detection probes of the plurality of detection probes each comprises: (i) a nucleic acid sequence that specifically binds to at least a portion of one of the two or more oligonucleotide sequences of the first and second oligonucleotide conjugated binding agents, and (ii) a detectable label; and (c) detecting the detectable labels of the at least two detection probes, thereby determining the locations of target analytes in the biological sample.

Also provided herein are methods of determining the location of target analytes (e.g., any of the exemplary analytes described herein) in a biological sample (e.g., any of the exemplary biological samples described herein) that includes: (a) delivering a plurality of oligonucleotide-conjugated binding agents to a biological sample, where an oligonucleotide-conjugated binding agent of the plurality of oligonucleotide-conjugated binding agents comprises an analyte-binding moiety that specifically binds to a target analyte in a biological sample and an oligonucleotide sequence; (b) optionally fixing the biological sample; (c) simultaneously contacting the biological sample with a plurality of detection probes, where at least one detection probe of the plurality of detection probes comprises (i) a nucleic acid sequence that specifically binds to at least a portion of the oligonucleotide sequence, and (ii) a detectable label; and (d) detecting the detectable label, thereby determining the location of the target analyte in the biological sample.

Also provided herein are methods of determining the location of target analytes (e.g., any of the exemplary analytes described herein) in a biological sample (e.g., any of the exemplary biological samples described herein) that includes: (a) delivering a plurality of oligonucleotide-conjugated binding agents to a biological sample, wherein an oligonucleotide-conjugated binding agent of the plurality of oligonucleotide-conjugated binding agents comprises an analyte-binding moiety that specifically binds to a target analyte in the biological sample conjugated to an oligonucleotide comprising two or more sequences; (b) simultaneously contacting the biological sample with a plurality of detection probes, wherein at least two detection probes of the plurality of detection probes each comprises (i) a nucleic acid sequence that specifically binds to at least a portion of one of the two or more oligonucleotide sequences, and (ii) a detectable label; and (c) detecting the detectable labels of the at least two detection probes, thereby determining the locations of the target analytes in the biological sample.

Also provided herein are methods of determining the presence of a target analyte (e.g., any of the exemplary analytes described herein, e.g., a protein) in a biological sample (e.g., any of the exemplary biological samples described herein) that includes: (a) delivering a plurality of oligonucleotide-conjugated binding agents to a biological sample, where an oligonucleotide-conjugated binding agent of the plurality of oligonucleotide-conjugated binding agents comprises an analyte-binding moiety that specifically binds to the target analyte in the biological sample, where the analyte-binding moiety is conjugated to an oligonucleotide sequence; (b) optionally fixing the biological sample; (c) simultaneously contacting the biological sample with a plurality of detection probes, where at least one detection probe of the plurality of detection probes comprises (i) a nucleic acid sequence that specifically binds to at least a portion of at least one of the one or more sequences, and (ii) a detectable label; and (d) detecting the detectable label, thereby determining the presence of the target analyte in the biological sample.

Also provided herein are methods of determining the presence of target analytes (e.g., any of the exemplary analytes described herein, e.g., a protein) in a biological sample (e.g., any of the exemplary biological samples described herein) that includes: (a) delivering a plurality of oligonucleotide-conjugated binding agents to a biological sample, wherein an oligonucleotide-conjugated binding agent of the plurality of oligonucleotide-conjugated binding agents comprises an analyte-binding moiety that specifically binds to a target analyte in the biological sample, wherein the analyte-binding moiety is conjugated to an oligonucleotide comprising two or more sequences; (b) simultaneously contacting the biological sample with a plurality of detection probes, wherein at least two detection probes of the plurality of detection probes each comprises (i) a nucleic acid sequence that specifically binds to at least a portion of one of the two or more oligonucleotide sequences, and (ii) a detectable label; and (c) detecting the detectable labels of the at least two detection probes, thereby determining the presence of the target analytes in the biological sample.

In the methods provided herein, an analyte-binding moiety can be identified by detecting an oligonucleotide conjugated to an oligonucleotide-conjugated binding agent that specifically binds to the analyte-binding moiety. In the methods provided herein, an analyte-binding moiety can also be identified by detecting its conjugated oligonucleotide, which in turn, allows the location or presence of the analyte to which the analyte-binding moiety is specifically bound to be identified in the biological sample.

In any of the methods provided herein, an oligonucleotide-conjugated binding agent can specifically bind another analyte-binding moiety specifically bound to a target analyte. In such embodiments, the oligonucleotide of the oligonucleotide-conjugated binding agent is detected (e.g., by any of the detection methods described herein) with a plurality of detection probes as described herein. In a non-limiting example, a first analyte-binding moiety (e.g., a primary antibody) can be delivered to a biological sample that specifically binds to a target analyte, followed by an oligonucleotide-conjugated binding agent that includes a second analyte binding moiety (e.g., a secondary antibody) and a conjugated oligonucleotide. In some embodiments, the plurality of analyte binding moieties, the plurality of oligonucleotide-conjugated binding agents, and the plurality of detection probes are delivered at the same time (e.g., simultaneously).

In any of the methods provided herein, a second oligonucleotide-conjugated binding agent can specifically bind another oligonucleotide-conjugated binding agent (e.g., a first oligonucleotide-conjugated binding agent) that is bound to a target analyte. In such embodiments, the oligonucleotide of the first oligonucleotide-conjugated binding agent, the oligonucleotide of the second oligonucleotide binding agent, or both, is detected (e.g., by any of the detection methods described herein) with a plurality of detection probes as described herein. In a non-limiting example, a first oligonucleotide-conjugated binding agent including a first analyte-binding moiety (e.g., a primary antibody) can be delivered to a biological sample that specifically binds to a target analyte, followed by a second oligonucleotide-conjugated binding agent that includes a second analyte binding moiety (e.g., a secondary antibody that binds the first analyte-binding moiety) and a conjugated oligonucleotide. In some embodiments, the first plurality of oligonucleotide-conjugated binding agents, the second plurality of oligonucleotide-conjugated binding agents, and the plurality of detection probes are delivered at the same time (e.g., simultaneously).

(b) Oligonucleotide-Conjugated Binding Agents

An oligonucleotide-conjugated binding agent used in the methods provided herein includes an analyte-binding moiety (e.g., any of the exemplary analyte-binding moieties described herein) that specifically binds to the target analyte in the biological sample, where the analyte-binding moiety is conjugated to an oligonucleotide comprising one or more (e.g., two, three, four, five, six, seven, eight, nine, or ten) sequences. In some embodiments, the oligonucleotide comprises two or more (e.g., three, four, five, six, seven, eight, nine, or ten) sequences.

FIG. 1 is a schematic diagram of an exemplary oligonucleotide-conjugated binding agent 102 comprised of an analyte binding moiety 104 and an oligonucleotide 108. An analyte binding moiety 104 is a molecule capable of binding to an analyte 106, wherein the analyte binding moiety can bind to the analyte 106 with high affinity and/or with high specificity. The oligonucleotide-conjugated binding agent can include a nucleotide sequence (e.g., an oligonucleotide), which can hybridize to at least a portion or an entirety of a detection probe. The analyte binding moiety 104 can include a polypeptide and/or an aptamer (e.g., an oligonucleotide or peptide molecule that binds to a specific target analyte). The analyte binding moiety 104 can include an antibody or antibody fragment (e.g., an antigen-binding fragment).

As used herein, the term "analyte binding moiety" refers to a molecule or moiety capable of binding to a macromolecular constituent (e.g., an analyte, e.g., a biological analyte). In some embodiments, an analyte-binding moiety is an antibody or an antigen-binding fragment thereof, a cell surface receptor-binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The analyte binding moiety can include a polypeptide and/or an aptamer (e.g., a polypeptide and/or an aptamer that binds to a target analyte). The analyte-binding moiety can include an antibody or antibody fragment (e.g., an antigen-binding fragment) that binds to a target analyte (e.g., a protein). The analyte-binding moiety can be a substrate for an enzyme, or a natural ligand. In some embodiments, the methods described herein include a first analyte binding moiety, a second analyte binding moiety, a third analyte binding moiety, or more (e.g., 4, 5, 6, 7, 8, 9, 10, or more analyte binding moieties.

An "antibody" is a polypeptide molecule that recognizes and binds to a complementary target antigen. Antibodies typically have a molecular structure shape that resembles a Y shape, or polymers thereof. Naturally-occurring antibodies, referred to as immunoglobulins, belong to one of the immunoglobulin classes IgG, IgM, IgA, IgD, and IgE. Antibodies can also be produced synthetically. For example, recombinant antibodies, which are monoclonal antibodies, can be synthesized using synthetic genes by recovering the antibody genes from source cells, amplifying into an appropriate vector, and introducing the vector into a host to cause the host to express the recombinant antibody. In general, recombinant antibodies can be cloned from any species of antibody-producing animal using suitable oligonucleotide primers and/or hybridization probes. Recombinant techniques can be used to generate antibodies and antibody fragments, including non-endogenous species.

Synthetic antibodies can be derived from non-immunoglobulin sources. For example, antibodies can be generated from nucleic acids (e.g., aptamers), and from non-immunoglobulin protein scaffolds (such as peptide aptamers) into which hypervariable loops are inserted to form antigen binding sites. Synthetic antibodies based on nucleic acids or peptide structures can be smaller than immunoglobulin-derived antibodies, leading to greater tissue penetration.

Antibodies can also include affimer proteins, which are affinity reagents that typically have a molecular weight of about 12-14 kDa. Affimer proteins generally bind to a target (e.g., a target protein) with both high affinity and specificity. Examples of such targets include, but are not limited to, ubiquitin chains, immunoglobulins, and C-reactive protein. In some embodiments, affimer proteins are derived from cysteine protease inhibitors, and include peptide loops and a variable N-terminal sequence that provides the binding site.

Antibodies can also include single domain antibodies ($V_H H$ domains and VNAR domains), scFvs, and Fab fragments.

In some embodiments, the methods described herein include utilizing a primary antibody conjugated with an oligonucleotide. In some embodiments, the methods described herein can include utilizing a combination of a primary and a secondary antibody, wherein the primary antibody binds to a target analyte and the secondary antibody is conjugated with an oligonucleotide and binds to the primary antibody (FIG. 2). In some embodiments, an analyte-binding moiety is a primary antibody. In some embodiments, an analyte-binding moiety is a primary antibody conjugated to an oligonucleotide. In some embodiments, the analyte-binding moiety can be a primary antibody and a second analyte binding moiety is a secondary antibody that specifically binds to the primary antibody and is conjugated to an oligonucleotide.

In some examples, the analyte-binding moiety can bind to a target analyte with a $K_D$ of about less than 50 µM, less than 25 µM, less than 10 µM, less than 5 µM, less than 1 µm, less than 750 nM, less than 500 nM, less than 250 nM, less than 100 nM, less than 1 nM, less than 750 pM, less than 500 pM, less than 250 pM, less than 100 pM, or less than 10 pM. In some examples, the analyte-binding moiety can bind to a target analyte with a $K_D$ of about 10 PM to about 50 µM, about 10 pM to about 25 µM, about 10 pM to about 10 µM, about 10 pM to about 5 µM, about 10 pM to about 1 µM, about 10 pM to about 750 nM, about 10 pM to about 500 nM, about 10 pM to about 250 nM, about 10 pM to about 100 nM, about 10 pM to about 1 nM, about 10 pM to about 750 pM, about 10 pM to about 500 pM, about 10 pM to about 250 pM, about 10 pM to about 100 pM, about 100 pM to about 50 µM, about 100 pM to about 25 µM, about 100 pM to about 10 µM, about 100 pM to about 5 µM, about 100 pM to about 1 µM, about 100 pM to about 750 nM, about 100 pM to about 500 nM, about 100 pM to about 250 nM, about 100 pM to about 100 nM, about 100 pM to about 1 nM, about 100 pM to about 750 pM, about 100 pM to about 500 pM, about 100 pM to about 250 pM, about 250 pM to about 50 µM, about 250 pM to about 25 µM, about 250 pM to about 10 µM, about 250 PM to about 5 µM, about 250 pM to about 1 µM, about 250 pM to about 750 nM, about 250 pM to about 500 nM, about 250 pM to about 250 nM, about 250 pM to about 100 nM, about 250 pM to about 1 nM, about 250 pM to about 750 pM, about 250 pM to about 500 pM, about 500 pM to about 50 µM, about 500 PM to about 25 M, about 500 pM to about 10 µM, about 500 pM to about 5 µM, about 500 pM to about 1 µM, about 500 pM to about 750 nM, about 500 pM to about 500 nM, about 500 pM to about 250 nM, about 500 pM to about 100 nM, about 500 pM to about 1 nM, about 500 pM to about 750 pM, about 750 pM to about 50 µM, about 750 pM to about 25 µM, about 750 pM to about 10 µM, about 750 pM to about 5 µM, about 750 pM to about 1 µM, about 750 pM to about 750 nM, about 750 pM to about 500 nM, about 750 pM to about 250 nM, about 750 pM to about 100 nM, about 750 pM to about 1 nM, about 1 nM to about 50 µM, about 1 nM to about 25 µM, about 1 nM to about 10 µM, about 1 nM to about 5 µM, about 1 nM to about 1 µM, about 1 nM to about 750 nM, about 1 nM to about 500 nM, about 1 nM to about 250 nM, about 1 nM to about 100 nM, about 100 nM to about 50 µM, about 100 nM to about 25 µM, about 100 nM to about 10 µM, about 100 nM to about 5 µM, about 100 nM to about 1 µM, about 100 nM to about 750 nM, about 100 nM to about 500 nM, about 100 nM to about 250 nM, 250 nM to about 50 µM, about 250 nM to about 25 µM, about 250 nM to about 10 µM, about 250 nM to about 5 µM, about 250 nM to about 1 µM, about 250 nM to about 750 nM, about 250 nM to about 500 nM, about 500 nM to about 50 µM, about 500 nM to about 25 µM, about 500 nM to about 10 µM, about 500 nM to about 5 µM, about 500 nM to about 1 µM, about 500 nM to about 750 nM, about 750 nM to about 50 µM, about 750 nM to about 25 µM, about 750 nM to about 10 µM, about 750 nM to about 5 µM, about 750 nM to about 1 µM, about 1 µM to about 50 µM, about 1 µM to about 25 µM, about 1 µM to about 10 µM, about 1 µM to about 5 µM, about 5 µM to about 50 µM, about 5 µM to about 25 µM, about 5 M to about 10 µM, about 10 µM to about 50 µM, about 10 µM to about 25 µM, or about 25 µM to about 50 µM.

In some embodiments, the target analyte can be a protein (e.g., an intracellular, cell surface, or an intracellular protein), an RNA (e.g., any of the exemplary RNAs described herein), a DNA (e.g., genomic DNA), a lipid, a small molecule, or any combination thereof.

In some embodiments, the biological sample has been permeabilized (e.g., using any of the exemplary permeabilizing agents or methods described herein) and the oligonucleotide-conjugated binding agent is capable of binding to a target analyte inside a cell (e.g., any of the exemplary cells described herein).

In some embodiments, an oligonucleotide-conjugated binding agent is capable of specifically binding to cell surface analytes, e.g., a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction. In some embodiments, oligonucleotide-conjugated binding agents are capable of binding to cell surface analytes that are post-translationally modified. In such embodiments, oligonucleotide-conjugated binding agents can be specific for cell surface analytes based on a given state of post-translational modification (e.g., phosphorylation, glycosylation, ubiquitination, nitrosylation, methylation, acetylation, or lipidation), such that a cell surface analyte profile can include post-translational modification information of one or more analytes.

Figure 3:
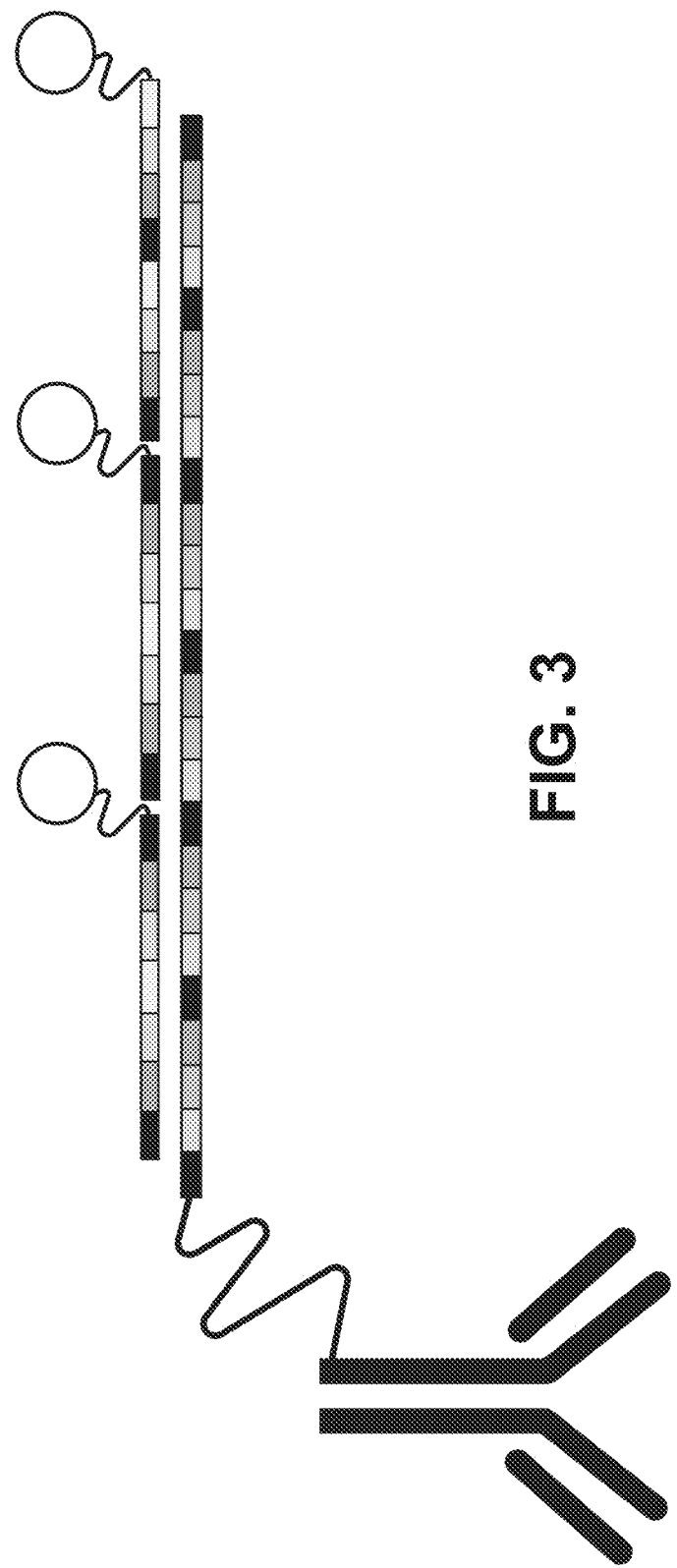
FIG. 3 is a schematic illustration of an oligonucleotide-conjugated binding agent wherein the oligonucleotide of the oligonucleotide-conjugated binding agent includes concatenated oligonucleotide sequences, wherein each of the oligonucleotide sequences is specifically bound by a detection probe including a detectable label.

In some embodiments, the oligonucleotide-conjugated binding agent includes an oligonucleotide sequence that is conjugated to or otherwise attached to the analyte-binding moiety. In some embodiments, the oligonucleotide comprises one sequence. In some embodiments, the oligonucleotide comprises two or more sequences. In some embodiments, the oligonucleotide comprises two or more sequences wherein the same sequence is repeated a multitude of times, for example at least two of the same sequence, at least three, at least four, at least five, at least six times the sequence is repeated for an oligonucleotide conjugated to an analyte-binding agent (FIG. 3). In some embodiments, an oligonucleotide conjugated to an analyte-binding moiety can be a concatenation of several different sequences. In some embodiments, the one or more sequences are associated with or otherwise identify the analyte-binding moiety.

In some embodiments, the oligonucleotide comprises two or more oligonucleotide sequences. In some embodiments, each of the two or more oligonucleotide sequences are the same sequence. In some embodiments, each of the two or more oligonucleotide sequences are a different sequence. In some embodiments, the oligonucleotide comprises two or more of the same or different sequences, or a combination thereof (e.g., three sequences wherein two sequences are the same and one is different, etc.). In some embodiments, the oligonucleotide comprises a total of two to ten sequences (e.g., two to nine, two to eight, two to seven, two to six, two to five, two to four, two to three, three to ten, three to nine, three to eight, three to seven, three to six, three to five, four to ten, four to nine, four to eight, four to seven, four to six, five to ten, five to nine, five to eight, five to seven, six to ten, six to nine, six to eight, seven to ten, seven to nine, or eight to ten sequences). In some embodiments, the oligonucleotide comprises a single sequence. In some embodiments, the sequence can have a high GC content (e.g., greater than 50%, 55%, 60%, 70%, or 80% GC content).

In some embodiments, the two or more sequences can have the same sequence. In some embodiments, each of the two or more sequences can comprise a different sequence. In some embodiment, the three or more sequences can be a combination of the same and different sequences. In some embodiments, each of the two or more sequences can have a total of about 5 to about 30 nucleotides (e.g., about 5 to about 25 nucleotides, about 5 to about 20 nucleotides, about 5 to about 18 nucleotides, about 5 to about 16 nucleotides, about 5 to about 14 nucleotides, about 5 to about 12 nucleotides, about 5 to about 10 nucleotides, about 5 to about 8 nucleotides, about 10 to about 30 nucleotides, about 10 to about 25 nucleotides, about 10 to about 20 nucleotides, about 10 to about 18 nucleotides, about 10 to about 16 nucleotides, about 10 to about 14 nucleotides, about 10 to about 12 nucleotides, about 15 to about 30 nucleotides, about 15 to about 25 nucleotides, about 15 to about 20 nucleotides, about 15 to about 18 nucleotides, about 20 to about 30 nucleotides, about 20 to about 25 nucleotides, or about 25 to about 30 nucleotides).

In some embodiments, more than one different oligonucleotide-conjugated binding agents can be applied to a biological sample sequentially or simultaneously. For example, a first oligonucleotide-conjugated binding agent can bind specifically to a first target analyte in the biological sample, while a second oligonucleotide-conjugated binding agent that binds specifically to a second target analyte in the biological sample can be applied either sequentially or simultaneously to the biological sample with the first oligonucleotide-conjugated binding agent. The methods described herein include the use of a first detection probe that binds specifically to the first oligonucleotide of the first oligonucleotide-conjugated binding agent and a second detection probe that binds specifically to the second oligonucleotide of the second oligonucleotide-conjugated binding agent, where the detectable label in the first detection probe is different from the detectable label in the second detection probe. The application of two or more oligonucleotide-conjugated binding agents to a biological sample, for example applying two, three, four, five or six (or more) oligonucleotide-conjugated binding agents allows for the detection of two, three, four, five or six (or more) target analytes based on the different fluorescent moieties attached to each of the specific detection probes. The application and detection of multiple different unique oligonucleotide-conjugated binding agents to a biological sample thereby allows for multiplexing the identification and detection of more than one different analytes in a biological sample.

In some embodiments, an oligonucleotide conjugated to the oligonucleotide-conjugated binding agent can further include sequences, such as, without limitation, a PCR handle, a sequencing priming site, and combinations thereof. In some embodiments, the oligonucleotide conjugated to the oligonucleotide-conjugated binding agent can further include at least one of a unique molecular identifier (UMI), a functional domain, a cleavage domain, or combinations thereof.

In some embodiments, the oligonucleotide is covalently-linked to the analyte-binding moiety. In some embodiments, the oligonucleotide is conjugated to the analyte-binding moiety via a linker. In some embodiments, the linker is a cleavable linker. In some embodiments, the linker is a non-cleavable linker.

(c) Detection Probes

A "detection probe", as used herein, includes (i) a nucleic acid sequence that specifically binds to at least a portion of at least one of the one or more oligonucleotide sequences; and (ii) a detectable label. The detectable label can be, e.g., a fluorophore (e.g., any of the exemplary fluorophores described herein or known in the art), a radioisotope (e.g., any of the exemplary radioisotopes described herein or known in the art), a chemiluminescent compound (e.g., any of the exemplary chemiluminescent compounds described herein or known in the art), a bioluminescent compound (e.g., any of the exemplary bioluminescent compounds described herein or known in the art), a dye (e.g., any of the exemplary dyes described herein or known in the art), or any of the other examples of detectable labels described herein or known in the art.

In some embodiments, the detectable label is a fluorophore. For example, the fluorophore can be from a group that includes: 7-AAD (7-Aminoactinomycin D), Acridine Orange (+DNA), Acridine Orange (+RNA), Alexa Fluor® 350, Alexa Fluor® 430, Alexa Fluor® 488, Alexa Fluor® 532, Alexa Fluor® 546, Alexa Fluor® 555, Alexa Fluor® 568, Alexa Fluor® 594, Alexa Fluor® 633, Alexa Fluor® 647, Alexa Fluor® 660, Alexa Fluor® 680, Alexa Fluor® 700, Alexa Fluor® 750, Allophycocyanin (APC), AMCA/AMCA-X, 7-Aminoactinomycin D (7-AAD), 7-Amino-4-methylcoumarin, 6-Aminoquinoline, Aniline Blue, ANS, APC-Cy7, ATTO-TAG™ CBQCA, ATTO-TAG™ FQ, Auramine O-Feulgen, BCECF (high pH), BFP (Blue Fluorescent Protein), BFP/GFP FRET, BOBO™-1/BO-PRO™-1, BOBO™-3/BO-PRO™-3, BODIPY® FL, BODIPY® TMR, BODIPY® TR-X, BODIPY® 530/550, BODIPY® 558/568, BODIPY® 564/570, BODIPY® 581/591, BODIPY® 630/650-X, BODIPY® 650-665-X, BTC, Calcein, Calcein Blue, Calcium Crimson™, Calcium Green-1™, Calcium Orange™, Calcofluor® White, 5-Carboxyfluoroscein (5-FAM), 5-Carboxynaphthofluoroscein, 6-Carboxyrhodamine 6G, 5-Carboxytetramethylrhodamine (5-TAMRA), Carboxy-X-rhodamine (5-ROX), Cascade Blue®, Cascade Yellow™, CCF2 (GeneBLAzer™), CFP (Cyan Fluorescent Protein), CFP/YFP FRET, Chromomycin A3, Cl-NERF (low pH), CPM, 6-CR 6G, CTC Formazan, Cy2®, Cy3®, Cy3.5®, Cy5®, Cy5.5®, Cy7®, Cychrome (PE-Cy5), Dansylamine, Dansyl cadaverine, Dansylchloride, DAPI, Dapoxyl, DCFH, DHR, DIA (4-Di-16-ASP), DiD (DilC18 (5)), DIDS, Dil (DilC18(3)), DiO (DiOC18 (3)), DiR (DilC18(7)), Di-4 ANEPPS, Di-8 ANEPPS, DM-NERF (4.5-6.5 pH), DsRed (Red Fluorescent Protein), EBFP, ECFP, EGFP, ELF®-97 alcohol, Eosin, Erythrosin, Ethidium bromide, Ethidium homodimer-1 (EthD-1), Europium (III) Chloride, 5-FAM (5-Carboxyfluorescein), Fast Blue, Fluorescein-dT phosphoramidite, FITC, Fluo-3, Fluo-4, FluorX®, Fluoro-Gold™ (high pH), Fluoro-Gold™ (low pH), Fluoro-Jade, FM® 1-43, Fura-2 (high calcium), Fura-2/BCECF, Fura Red™ (high calcium), Fura Red™/Fluo-3, GeneBLAzer™ (CCF2), GFP Red Shifted (rsGFP), GFP Wild Type, GFP/BFP FRET, GFP/DsRed FRET, Hoechst 33342 & 33258, 7-Hydroxy-4-methylcoumarin (pH 9), 1,5 IAEDANS, Indo-1 (high calcium), Indo-1 (low calcium), Indodicarbocyanine, Indotricarbocyanine, JC-1, 6-JOE, JOJO™-1/JO-PRO™-1, LDS 751 (+DNA), LDS 751 (+RNA), LOLO™-1/LO-PRO™-1, Lucifer Yellow, LysoSensor™ Blue (pH 5), LysoSensor™ Green (pH 5), LysoSensor™ Yellow/Blue (pH 4.2), LysoTracker® Green, LysoTracker® Red, LysoTracker® Yellow, Mag-Fura-2, Mag-Indo-1, Magnesium Green™, Marina Blue®, 4-Methylumbelliferone, Mithramycin, MitoTracker® Green, MitoTracker® Orange, MitoTracker® Red, NBD (amine), Nile Red, Oregon Green® 488, Oregon Green® 500, Oregon Green® 514, Pacific Blue, PBF1, PE (R-phycoerythrin), PE-Cy5, PE-Cy7, PE-Texas Red, PerCP (Peridinin chlorphyll protein), PerCP-Cy5.5 (TruRed), PharRed (APC-Cy7), C-phycocyanin, R-phycocyanin, R-phycoerythrin (PE), PI (Propidium Iodide), PKH26, PKH67, POPO™-1/PO-PRO™-1, POPO™-3/PO-PRO™-3, Propidium Iodide (PI), PyMPO, Pyrene, Pyronin Y, Quantam Red (PE-Cy5), Quinacrine Mustard, R670 (PE-Cy5), Red 613 (PE-Texas Red), Red Fluorescent Protein (DsRed), Resorufin, RH 414, Rhod-2, Rhodamine B, Rhodamine Green™, Rhodamine Red™, Rhodamine Phalloidin, Rhodamine 110, Rhodamine 123, 5-ROX (carboxy-X-rhodamine), S65A, S65C, S65L, S65T, SBFI, SITS, SNAFL®-1 (high pH), SNAFL®-2, SNARFR-1 (high pH), SNARF®-1 (low pH), Sodium Green™, SpectrumAqua®, SpectrumGreen® #1, SpectrumGreen® #2, SpectrumOrange®, SpectrumRed®, SYTOR 11, SYTOR 13, SYTOR 17, SYTOR 45, SYTOX® Blue, SYTOX® Green, SYTOX® Orange, 5-TAMRA (5-Carboxytetramethylrhodamine), Tetramethylrhodamine (TRITC), Texas Red®/Texas Red®-X, Texas Red®-X (NHS Ester), Thiadicarbocyanine, Thiazole Orange, TOTO®-1/TO-PRO®-1, TOTO®-3/TO-PRO®-3, TO-PRO®-5, Tri-color (PE-Cy5), TRITC (Tetramethylrhodamine), TruRed (PerCP-Cy5.5), WW 781, X-Rhodamine (XRITC), Y66F, Y66H, Y66 W, YFP (Yellow Fluorescent Protein), YOYOR-1/YO-PRO®-1, YOYO®-3/YO-PRO®-3, 6-FAM (Fluorescein), 6-FAM (NHS Ester), 6-FAM (Azide), HEX, TAMRA (NHS Ester), Yakima Yellow, MAX, TET, TEX615, ATTO 488, ATTO 532, ATTO 550, ATTO 565, ATTO Rho101, ATTO 590, ATTO 633, ATTO 647N, TYE 563, TYE 665, TYE 705, 5' IRDye® 700, 5' IRDye® 800, 5' IRDye® 800CW (NHS Ester), WellRED D4 Dye, WellRED D3 Dye, WellRED D2 Dye, Lightcycler® 640 (NHS Ester), and Dy 750 (NHS Ester).

In some embodiments, a detection probe can include a single detectable label. In some embodiments, each of the at least two detection probes comprises the same detectable label. In some embodiments, each of the at least two detection probes comprises a different detectable label.

In some embodiments, the plurality of detection probes comprises two or more detection probes (e.g., at least 2, at least 3, at least 4, at least 5, at least 6, at least 7, at least 8, at least 9, at least 10, at least 12, at least 14, at least 16, at least 18, or at least 20 detectable probes, or about 2 to about 20, about 2 to about 15, about 2 to about 10, about 2 to about 8, about 2 to about 6, about 2 to about 4, about 4 to about 20, about 4 to about 15, about 4 to about 10, about 4 to about 8, about 4 to about 6, about 6 to about 20, about 6 to about 15, about 6 to about 10, about 6 to about 8, about 8 to about 20, about 8 to about 15, about 8 to about 10, about 10 to about 20, about 10 to about 15, or about 15 to about 20 detection probes).

In some embodiments, each of the two or more detection probes comprise a single detectable label (e.g., any of the exemplary detectable labels described herein). In some embodiments, the single detectable label is the same in each of the two or more detectable probes. In some embodiments, the single detectable label is different in each of the two or more detectable probes. In some embodiments, each of the two or more detectable probes comprises two or more detectable labels. In some embodiments, each of the two or more detectable labels are the same detectable label. In some embodiments, each of the two or more detectable labels are different detectable labels.

In some examples, an oligonucleotide of an oligonucleotide-conjugated binding agent can include a single sequence that is specifically bound by a single detection probe. In some examples, an oligonucleotide of an oligonucleotide-conjugated binding agent can include two or more sequences, where each sequence is the same sequence. In such embodiments, the two or more sequences are bound by multiple copies of the same detection probe including, e.g., the same detectable label.

In some examples, an oligonucleotide of an oligonucleotide-conjugated binding agent can include two or more sequences, where each of the two or more sequences is different. In such embodiments, each of the two or more sequences is specifically bound by a different detection probe, e.g., comprising a different detectable label.

In some embodiments, the detection probe further includes a linker that connects the nucleic acid detectable probe sequence to the detectable label(s). In some embodiments, the linker is a cleavable linker. In some embodiments, the linker in a non-cleavable linker.

In some embodiments, the plurality of detection probes hybridize to the two or more oligonucleotide sequences in the conjugated oligonucleotide of the oligonucleotide-conjugated binding agent. In some embodiments, the plurality of detection probes hybridize to the two or more oligonucleotide sequences in the conjugated oligonucleotide of the oligonucleotide-conjugated binding agent that is bound to an analyte binding moiety. For example, FIG. 2 (right) shows an exemplary schematic showing a first analyte-binding moiety (e.g., a primary antibody) bound to a target analyte and an oligonucleotide-conjugated binding agent including another analyte-binding moiety (e.g., a secondary antibody) and a conjugated oligonucleotide. In such embodiments, the plurality of detection probes hybridize to the oligonucleotide of the oligonucleotide-conjugated binding agent already bound to the first analyte-binding moiety.

(d) Analytes

The methods described in this disclosure can be used to detect and analyze a wide variety of different analytes. For the purpose of this disclosure, an "analyte" can include any biological substance, structure, moiety, or component to be analyzed. The term "target" or "target analyte" can similarly refer to an analyte of interest.

Analytes can be broadly classified into one of two groups: nucleic acid analytes, and non-nucleic acid analytes. Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments. In some embodiments, the analyte can be an organelle (e.g., nuclei or mitochondria).

Cell surface features corresponding to analytes can include, but are not limited to, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, an extracellular matrix protein, a posttranslational modification (e.g., phosphorylation, glycosylation, ubiquitination, nitrosylation, methylation, acetylation or lipidation) state of a cell surface protein, a gap junction, and an adherens junction.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis.

Examples of nucleic acid analytes include DNA analytes such as genomic DNA, methylated DNA, specific methylated DNA sequences, fragmented DNA, mitochondrial DNA, in situ synthesized PCR products, and RNA/DNA hybrids.

In certain embodiments, an analyte can be extracted from a live cell. Processing conditions can be adjusted to ensure that a biological sample remains live during analysis, and analytes are extracted from (or released from) live cells of the sample. Live cell-derived analytes can be obtained only once from the sample, or can be obtained at intervals from a sample that continues to remain in viable condition.

In some embodiments, the target analyte is selected from the group consisting of: RNA, DNA, a protein (e.g., a cell surface protein, an extracellular protein, or an intracellular protein), a small molecule, and a metabolite. In some embodiments, the target analyte is a protein from the group consisting of a cell surface protein, an extracellular protein and an intracellular protein.

In some embodiments, the detecting is performed using imaging (e.g., fluorescence microscopy), epifluorescence microscopy, confocal microscopy, or multiphoton microscopy.

In some embodiments, the methods described herein allow for identification of the location or presence of greater than 2, greater than 5, greater than 10, greater than 20, greater than 30, greater than 40, greater than 50, greater than 75, greater than 100, greater than 200, greater than 400, greater than 600, greater than 800, greater than 1,000, greater than 1,500, or greater than 2,000 target analytes, or about 2 to about 2,000, about 2 to about 1,500, about 2 to about 1,000, about 2 to about 800, about 2 to about 600, about 2 to about 400, about 2 to about 200, about 2 to about 100, about 2 to about 50, about 2 to about 40, about 2 to about 20, about 2 to about 10, about 2 to about 5, about 5 to about 2,000, about 5 to about 1,500, about 5 to about 1,000, about 5 to about 800, about 5 to about 600, about 5 to about 400, about 5 to about 200, about 5 to about 100, about 5 to about 50, about 5 to about 40, about 5 to about 20, about 5 to about 10, about 10 to about 2,000, about 10 to about 1,500, about 10 to about 1,000, about 10 to about 800, about 10 to about 600, about 10 to about 400, about 10 to about 200, about 10 to about 100, about 10 to about 50, about 10 to about 40, about 10 to about 20, about 20 to about 2,000, about 20 to about 1,500, about 20 to about 1,000, about 20 to about 800, about 20 to about 600, about 20 to about 400, about 20 to about 200, about 20 to about 100, about 20 to about 50, about 20 to about 40, about 40 to about 2,000, about 40 to about 1,500, about 40 to about 1,000, about 40 to about 800, about 40 to about 600, about 40 to about 400, about 40 to about 200, about 40 to about 100, about 40 to about 50, about 50 to about 2,000, about 50 to about 1,500, about 50 to about 1,000, about 50 to about 800, about 50 to about 600, about 50 to about 400, about 50 to about 200, about 50 to about 100, about 100 to about 2,000, about 100 to about 1,500, about 100 to about 1,000, about 100 to about 800, about 100 to about 600, about 100 to about 400, about 100 to about 200, about 200 to about 2,000, about 200 to about 1,500, about 200 to about 1,000, about 200 to about 800, about 200 to about 600, about 200 to about 400, about 400 to about 2,000, about 400 to about 1,500, about 400 to about 1,000, about 400 to about 800, about 400 to about 600, about 600 to about 2,000, about 600 to about 1,500, about 600 to about 1,000, about 600 to about 800, about 800 to about 2,000, about 800 to about 1,500, about 800 to about 1,000, about 1,000 to about 2,000, about 1,000 to about 1,500, or about 1,500 to about 2,000 target analytes. In general, the methods can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

(e) Biological Samples

Methods disclosed herein can be performed on any type of biological sample. In some embodiments, the biological sample is a tissue sample. In some embodiments, the tissue sample is a fixed tissue sample. In some embodiments, the fixed tissue sample is a formalin fixed paraffin embedded tissue sample. In some embodiments, the tissue sample is a fresh frozen tissue sample.

A "biological sample" is obtained from the subject for analysis using any of a variety of techniques including, but not limited to, biopsy, surgery, and laser capture microscopy (LCM), and generally includes cells and/or other biological material from the subject. In addition to the subjects described above, a biological sample can be obtained from non-mammalian organisms (e.g., a plants, an insect, an arachnid, a nematode (e.g., (*Caenorhabditis elegans*), a fungi, an amphibian, or a fish (e.g., zebrafish)). A biological sample can be obtained from a prokaryote such as a bacterium, e.g., *Escherichia coli, Staphylococci* or *Mycoplasma pneumoniae*; an archaea; a virus such as Hepatitis C virus or human immunodeficiency virus; or a viroid. A biological sample can be obtained from a eukaryote, such as a patient derived organoid (PDO) or patient derived xenograft (PDX). The biological sample can include organoids, a miniaturized and simplified version of an organ produced in vitro in three dimensions that shows realistic micro-anatomy. Organoids can be generated from one or more cells from a tissue, embryonic stem cells, and/or induced pluripotent stem cells, which can self-organize in three-dimensional culture owing to their self-renewal and differentiation capacities. In some embodiments, an organoid is a cerebral organoid, an intestinal organoid, a stomach organoid, a lingual organoid, a thyroid organoid, a thymic organoid, a testicular organoid, a hepatic organoid, a pancreatic organoid, an epithelial organoid, a lung organoid, a kidney organoid, a gastruloid, a cardiac organoid, or a retinal organoid. Subjects from which biological samples can be obtained can be healthy or asymptomatic individuals, individuals that have or are suspected of having a disease (e.g., cancer) or a pre-disposition to a disease, and/or individuals that are in need of therapy or suspected of needing therapy.

Biological samples can be derived from a homogeneous culture or population of the subjects or organisms mentioned herein or alternatively from a collection of several different organisms, for example, in a community or ecosystem.

Biological samples can include one or more diseased cells. A diseased cell can have altered metabolic properties, gene expression, protein expression, and/or morphologic features. Examples of diseases include inflammatory disorders, metabolic disorders, nervous system disorders, and cancer. Cancer cells can be derived from solid tumors, hematological malignancies, cell lines, or obtained as circulating tumor cells.

In some embodiments, the biological sample is washed (e.g., using any of the exemplary washing buffers and conditions described herein or known in the art) after delivering the plurality of oligonucleotide-conjugated binding agents and before fixing the biological sample to remove oligonucleotide-conjugated binding agents that are not specifically bound to the target analyte. In some embodiments, the fixing is performed to stabilize the oligonucleotide-conjugated binding agent bound to the analyte, while the detection probe interacts with the oligonucleotide sequence of the oligonucleotide-conjugated binding agent.

In some embodiments, the biological sample is washed (e.g., using any of the exemplary washing buffers or washing conditions described herein or known in the art) after contacting the biological sample with a plurality of detection probes to remove detection probes that are not specifically bound to the oligonucleotide sequence of the oligonucleotide-conjugated binding agent and before detecting the detectable label of the detection probe.

In some embodiments, the biological sample can be any of the exemplary biological samples described herein. In some examples, the biological sample is a tissue sample (e.g., a fixed tissue sample (e.g., a formalin fixed paraffin embedded (FFPE) tissue sample) or a fresh, frozen tissue sample).

In some embodiments, the methods described herein can further comprise fixing the biological sample after delivering the plurality of oligonucleotide-conjugated binding agents. In some embodiments, the fixing comprises paraformaldehyde, formalin, methanol, acetone, ethanol, formaldehyde, glutaraldehyde, or combinations thereof. In some embodiments, the methods can further comprise, washing the biological sample to remove oligonucleotide-conjugated binding agents that are not specifically bound to the target analytes. In some embodiments, the methods can further comprise, washing the biological sample to remove detection probes that are not specifically bound to the plurality of oligonucleotide-conjugated binding agents.

(f) Signal Amplification

After an analyte binding moiety of an oligonucleotide-conjugated binding agent specifically binds to a target analyte and at least two detection probes of a plurality of detection probes hybridize with the two or more oligonucleotide sequences of the oligonucleotide, the hybridized detection probes are detected and analyzed. In some embodiments, the detectable labels of the detection probes can produce an optical signal (e.g., fluorescence). In some embodiments, the intensity of the optical signal correlates with the relative abundance of detectable labels bound to the oligonucleotide-conjugated binding agent.

In some embodiments, an oligonucleotide comprises two or more oligonucleotide sequences. In some embodiments, the oligonucleotide comprises two or more sequences wherein the same sequence is repeated a multitude of times, for example at least two of the same sequence, at least three, at least four, at least five, at least six times the sequence is repeated for an oligonucleotide conjugated to an analyte-binding agent. In some embodiments, the oligonucleotide comprises a total of two to ten sequences (e.g., two to nine, two to eight, two to seven, two to six, two to five, two to four, two to three, three to ten, three to nine, three to eight, three to seven, three to six, three to five, four to ten, four to nine, four to eight, four to seven, four to six, five to ten, five to nine, five to eight, five to seven, six to ten, six to nine, six to eight, seven to ten, seven to nine, or eight to ten sequences). In some embodiments, each of the two or more oligonucleotide sequences are the same sequence. In some embodiments, a detection probe binds to an oligonucleotide sequence, wherein the detection probe includes a single detectable label. In some embodiments, at least two detection probes (e.g., at least three, at least four, at least five, or at least six probes) bind to the at least two repeating oligonucleotide sequences. In some embodiments, each of the at least two detection probes comprises the same detectable label, thereby amplifying the optical signal produced by the detection probes (FIG. 3).

(g) Simultaneous Multiplexing

In some embodiments, of any of the methods described herein, determining the location and/or presence of target analytes can include concurrent detection and analysis of two or more different types of analytes. In some embodiments, the methods described herein allow for identification of the location or presence of greater than 2, greater than 5, greater than 10, greater than 20, greater than 30, greater than 40, greater than 50, greater than 75, greater than 100, greater than 200, greater than 400, greater than 600, greater than 800, greater than 1,000, greater than 1,500, or greater than 2,000 target analytes, or about 2 to about 2,000, about 2 to about 1,500, about 2 to about 1,000, about 2 to about 800, about 2 to about 600, about 2 to about 400, about 2 to about 200, about 2 to about 100, about 2 to about 50, about 2 to about 40, about 2 to about 20, about 2 to about 10, about 2 to about 5, about 5 to about 2,000, about 5 to about 1,500, about 5 to about 1,000, about 5 to about 800, about 5 to about 600, about 5 to about 400, about 5 to about 200, about 5 to about 100, about 5 to about 50, about 5 to about 40, about 5 to about 20, about 5 to about 10, about 10 to about 2,000, about 10 to about 1,500, about 10 to about 1,000, about 10 to about 800, about 10 to about 600, about 10 to about 400, about 10 to about 200, about 10 to about 100, about 10 to about 50, about 10 to about 40, about 10 to about 20, about 20 to about 2,000, about 20 to about 1,500, about 20 to about 1,000, about 20 to about 800, about 20 to about 600, about 20 to about 400, about 20 to about 200, about 20 to about 100, about 20 to about 50, about 20 to about 40, about 40 to about 2,000, about 40 to about 1,500, about 40 to about 1,000, about 40 to about 800, about 40 to about 600, about 40 to about 400, about 40 to about 200, about 40 to about 100, about 40 to about 50, about 50 to about 2,000, about 50 to about 1,500, about 50 to about 1,000, about 50 to about 800, about 50 to about 600, about 50 to about 400, about 50 to about 200, about 50 to about 100, about 100 to about 2,000, about 100 to about 1,500, about 100 to about 1,000, about 100 to about 800, about 100 to about 600, about 100 to about 400, about 100 to about 200, about 200 to about 2,000, about 200 to about 1,500, about 200 to about 1,000, about 200 to about 800, about 200 to about 600, about 200 to about 400, about 400 to about 2,000, about 400 to about 1,500, about 400 to about 1,000, about 400 to about 800, about 400 to about 600, about 600 to about 2,000, about 600 to about 1,500, about 600 to about 1,000, about 600 to about 800, about 800 to about 2,000, about 800 to about 1,500, about 800 to about 1,000, about 1,000 to about 2,000, about 1,000 to about 1,500, or about 1,500 to about 2,000 target analytes. In general, the methods can be used to analyze any number of analytes.

In some embodiments, a detection probe can bind to an oligonucleotide sequence that is associated with a specific target analyte. In some embodiments, a plurality of detection probes comprises at least two detection probes that include a same nucleic acid sequence, wherein each of the at least two detection probes comprises the same detectable label. In some embodiments, a plurality of detection probes comprises at least two detection probes that include different nucleic acid sequences, wherein each of the at least two detection probes comprises a different detectable label. In some embodiments, a plurality of detection probes detect (e.g., detect by any of the detection methods described herein) an oligonucleotide of an oligonucleotide-conjugated binding agent specifically bound to a target analyte. In some embodiments, a plurality of detection probes detect (e.g., detect by any of the detection methods described herein) an oligonucleotide of an oligonucleotide-conjugated binding agent specifically bound to a first analyte-binding moiety, where the first analyte binding moiety binds a target analyte.

In some embodiments, the plurality of detectable probes comprises two or more detectable probes (e.g., at least 2, at least 3, at least 4, at least 5, at least 6, at least 7, at least 8, at least 9, at least 10, at least 12, at least 14, at least 16, at least 18, or at least 20 detectable probes, or about 2 to about 20, about 2 to about 15, about 2 to about 10, about 2 to about 8, about 2 to about 6, about 2 to about 4, about 4 to about 20, about 4 to about 15, about 4 to about 10, about 4 to about 8, about 4 to about 6, about 6 to about 20, about 6 to about 15, about 6 to about 10, about 6 to about 8, about 8 to about 20, about 8 to about 15, about 8 to about 10, about 10 to about 20, about 10 to about 15, or about 15 to about 20 detectable probes).

Figure 4:
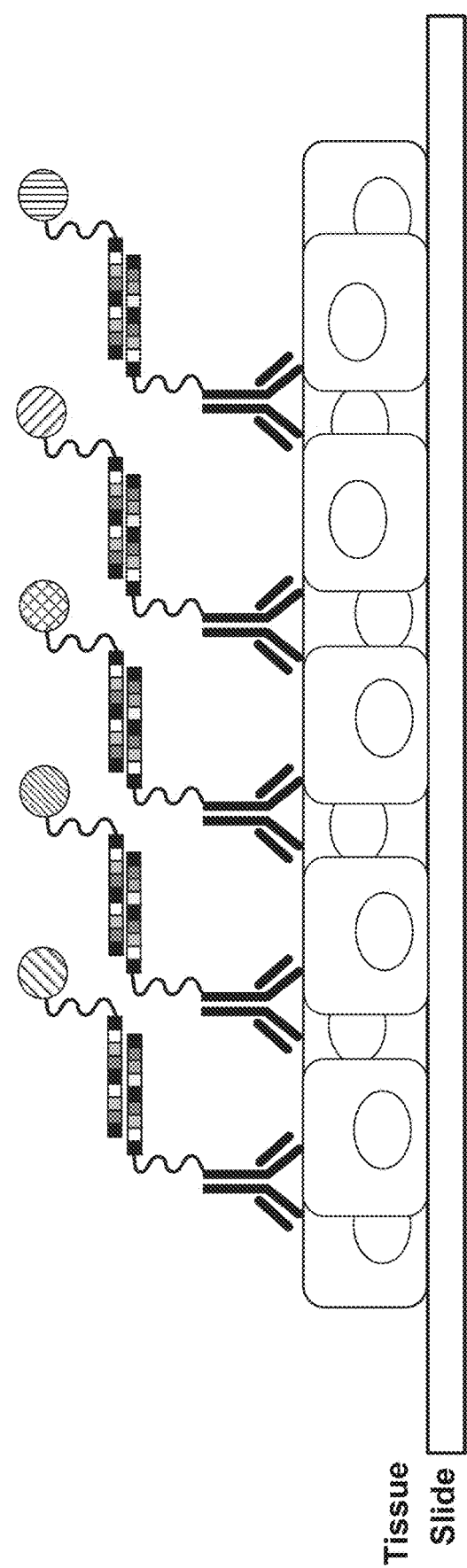
FIG. 4 is a schematic illustration of different oligonucleotide-conjugated binding agents, wherein the oligonucleotide of each oligonucleotide-conjugated binding agent is hybridized to two or more detection probes each comprising a different detectable label.

In some embodiments, the detectable label is different in each of the two or more detectable probes. In some embodiments, each of the two or more detectable probes comprises two or more detectable labels. In some embodiments, each of the two or more detectable labels are different detectable labels (FIG. 4).

In some examples, an oligonucleotide of an oligonucleotide-conjugated binding agent can include two or more sequences, where each of the two or more sequences is different. In such embodiments, each of the two or more sequences is specifically bound by a different detection probe, e.g., comprising a different detectable label.

In some embodiments, two or more classes of target analytes can be concurrently identified. In some embodiments, three or more (e.g., four or more, five or more, or six or more) classes of biological analytes can be concurrently measured.

EXAMPLE

Example 1—Exemplary Methods for Using an Oligonucleotide-Conjugated Binding Agent for Immunostaining FIG. 2 (left) shows an exemplary schematic of an oligonucleotide-conjugated binding agent that includes an analyte-binding moiety (e.g., a primary antibody) and an oligonucleotide (e.g., a conjugated oligonucleotide). FIG. 2 (right) shows an exemplary schematic of an analyte-binding moiety (e.g., a primary antibody) that specifically binds to a target analyte in a biological sample and an oligonucleotide-conjugated binding agent where the binding agent is a secondary antibody that binds specifically to the primary antibody. In both exemplary schematics shown, detection probes (e.g., labeled detection probes) can be hybridized to the antibody conjugated oligonucleotide. Although FIG. 2 shows primary and/or secondary antibodies detecting a target analyte, it is appreciated that the analyte-binding moiety can include different molecules as described herein.

FIG. 3 shows an exemplary schematic of hybridization of a detection probe to an oligonucleotide-conjugated binding agent. The oligonucleotide of an oligonucleotide-conjugated binding agent can have different lengths and include multiple repeats, which allows for signal amplification after hybridization of multiple copies of a detection probe to two or more repeated sequences. The detectable label attached to a detection probe can be a fluorophore (e.g., any of the exemplary fluorophores described herein).

In a non-limiting example, an oligonucleotide-conjugated binding agent and a detection probe(s) can be designed to allow for signal amplification. FIG. 3 shows an oligonucleotide-conjugated binding agent comprising concatenated identical oligonucleotide sequences, which are specifically bound by multiple identical copies of a detection probe. The hybridization of multiple detection probes to the oligonucleotide-conjugated binding agent allows for signal amplification (e.g., light emission or fluorescence emission), which in turn, allows for greater visibility of the detectable signal by standard epifluorescence microscopy.

In a non-limiting example, multiplexing can be achieved by using multiple different oligonucleotide-conjugated binding agents, each including a different oligonucleotide sequence which can be recognized by differently labeled detection probes. FIG. 4 shows an exemplary schematic of multiple oligonucleotide-conjugated binding agents interacting with different analytes within a tissue sample, wherein each oligonucleotide-conjugated binding agent interacts with a different detection probe comprising a different detectable label (e.g., different fluorophores). The detectable labels of the multiple detection probes can be visualized by standard, confocal, or multiphoton microscopy. In some embodiments, spectral imaging and linear unmixing can be performed. It is further contemplated that one or more of the different oligonucleotide-conjugated binding agents depicted in FIG. 4 could include concatenated oligonucleotide sequences as demonstrated in FIG. 3.

What is claimed is:

1. A method of determining a location of a target protein in a tissue sample, comprising:
    (a) delivering:
        (i) a first subset of antibodies or antigen-binding fragments thereof to the tissue sample, wherein an antibody or antigen-binding fragment thereof of the first subset of antibodies or antigen-binding fragments thereof binds the target protein; and
        (ii) a first plurality of oligonucleotide-conjugated binding agents to the tissue sample, wherein an oligonucleotide-conjugated binding agent of the first plurality of oligonucleotide-conjugated binding agents comprises a second subset of antibodies or antigen-binding fragments thereof that bind to the first subset of antibodies or antigen binding fragments thereof bound to the target protein in the tissue sample, wherein a second antibody or antigen-binding fragment thereof of the second subset is conjugated to an oligonucleotide comprising at least two oligonucleotide sequences, wherein the at least two oligonucleotide sequences are each capable of hybridizing to a first detection probe of a plurality of detection probes; and
        (iii) a second plurality of oligonucleotide-conjugated binding agents to the tissue sample, wherein an oligonucleotide-conjugated binding agent of the second plurality of oligonucleotide-conjugated binding agents comprises a third subset of antibodies or antigen-binding fragments thereof that bind to the target protein in the tissue sample and wherein the third antibody or antigen-binding fragment thereof of the third subset is conjugated to an oligonucleotide comprising at least two oligonucleotide sequences, wherein the at least two oligonucleotide sequences are each capable of hybridizing to a second detection probe of the plurality of detection probes;
    (b) fixing the tissue sample;
    (c) contacting the tissue sample with a plurality of detection probes, wherein at least two detection probes of the plurality of detection probes each comprises: (i) a nucleic acid sequence that hybridizes to a portion of one of the at least two oligonucleotide sequences of the first plurality oligonucleotide-conjugated binding agents and the second plurality of oligonucleotide-conjugated binding agents, and (ii) a detectable label; and
    (d) detecting the detectable labels, thereby determining the locations of the target protein in the tissue sample.

2. The method of claim 1, wherein fixing the tissue sample comprises use of a fixative, wherein the fixative is selected from the group consisting of: paraformaldehyde, formalin formaldehyde, glutaraldehyde, and a combination thereof.

3. The method of claim 1, wherein the method further comprises, washing the tissue sample to remove the antibody or antigen-binding fragment thereof of the first subset of antibodies or antigen-binding fragment thereof that are not specifically bound to the target protein, the antibody or antigen-binding fragment thereof of the second subset of antibodies or antigen-binding fragments thereof that are not specifically bound to the first subset of antibodies or antigen-binding fragments thereof, the detection probes that are not specifically bound to the first plurality of oligonucleotide-conjugated binding agents and/or the second plurality of oligonucleotide-conjugated binding agents, or the antibody or antigen-binding fragment thereof of the third subset of antibodies or antigen-binding fragments thereof that are not specifically bound to the target protein.

4. The method of claim 1, wherein each of the at least two oligonucleotide sequences of the first plurality of oligonucleotide-binding agents or the second plurality of oligonucleotide-binding agents are the same sequence.

5. The method of claim 1, wherein each of the at least two oligonucleotide sequences of the first plurality of oligonucleotide-binding agents or the second plurality of oligonucleotide-binding agents are different sequences.

6. The method of claim 1, wherein each of the at least two oligonucleotide sequences of the first plurality of oligonucleotide-binding agents or the second plurality of oligonucleotide-binding agents comprises a total of 5 nucleotides to 30 nucleotides and wherein the oligonucleotide of the first plurality of oligonucleotide-binding agents or the second plurality of oligonucleotide-binding agents comprises a total of two to ten sequences.

7. The method of claim 1, wherein each of the at least two detection probes comprises the same detectable label.

8. The method of claim 1, wherein each of the at least two detection probes comprises a different detectable label.

9. The method of claim 1, wherein the detectable labels comprise a fluorophore and the detecting is performed using imaging, wherein the imaging comprises epifluorescence microscopy or confocal microscopy or multiphoton microscopy.

10. The method of claim 1, wherein the tissue sample is a fresh-frozen tissue sample, a fixed tissue sample, or a formalin-fixed paraffin-embedded sample.

11. A method of determining a location of a target protein in a tissue sample, comprising:
(a) delivering a plurality of oligonucleotide-conjugated binding agents to the tissue sample, wherein an oligonucleotide-conjugated binding agent of the plurality of oligonucleotide-conjugated binding agents comprises an antibody or antigen-binding fragment thereof that binds to the target protein in the tissue sample, wherein the antibody or antigen-binding fragment thereof is conjugated to an oligonucleotide comprising at least two oligonucleotide sequences;
(b) fixing the tissue sample;
(c) contacting the tissue sample with a plurality of detection probes, wherein at least two detection probes of the plurality of detection probes each comprises:
(i) a nucleic acid sequence that hybridizes to a portion of one of the at least two oligonucleotide sequences, and
(ii) a detectable label; and
(d) detecting the detectable labels of the at least two detection probes, thereby determining the location of the target protein in the tissue sample.

12. The method of claim 11, wherein the delivering in step (a) further comprises delivering a second plurality of antibodies or antigen-binding fragments thereof that bind to the target protein in the tissue sample and a second plurality of oligonucleotide-conjugated binding agents that bind to the second plurality of antibodies or antigen-binding fragments thereof bound to the target protein in the tissue sample, wherein a second antibody or antigen-binding fragment thereof is conjugated to a second oligonucleotide comprising at least two oligonucleotide sequences.

13. The method of claim 12, wherein each of the at least two oligonucleotide sequences are the same sequence.

14. The method of claim 12, wherein each of the at least two oligonucleotide sequences are different sequences.

15. The method of claim 12, wherein each of the at least two oligonucleotide sequences comprises a total of 5 nucleotides to 30 nucleotides and wherein the second oligonucleotide comprises a total of two to ten sequences.

16. The method of claim 12, wherein each of the at least two detection probes comprises the same detectable label.

17. The method of claim 12, wherein each of the at least two detection probes comprises a different detectable label.

18. A method of determining the presence of a protein in a tissue sample, comprising:
(a) delivering a plurality of oligonucleotide-conjugated binding agents to the tissue sample, wherein an oligonucleotide-conjugated binding agent of the plurality of oligonucleotide-conjugated binding agents comprises an antibody or antigen-binding fragment thereof that binds to the protein in the tissue sample, wherein the antibody or antigen-binding fragment thereof is conjugated to an oligonucleotide comprising at least two oligonucleotide sequences;
(b) fixing the tissue sample;
(c) contacting the tissue sample with a plurality of detection probes, wherein at least two detection probes of the plurality of detection probes each comprises (i) a nucleic acid sequence that hybridizes to a portion of one of the at least two oligonucleotide sequences, and (ii) a detectable label; and
(d) detecting the detectable labels of the at least two detection probes, thereby determining the presence of the protein in the tissue sample.

19. The method of claim 1, wherein fixing the tissue comprises use of a fixative, wherein the fixative is selected from the group consisting of: methanol, acetone, ethanol, and a combination thereof.

* * * * *